US011523349B1

(12) United States Patent
Huang

(10) Patent No.: US 11,523,349 B1
(45) Date of Patent: Dec. 6, 2022

(54) METHOD AND APPARATUS FOR POWER CONTROL REGARDING MULTI-TRP UPLINK TRANSMISSION IN A WIRELESS COMMUNICATION SYSTEM

(71) Applicant: ASUSTek Computer Inc., Taipei (TW)

(72) Inventor: Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/748,969

(22) Filed: May 19, 2022

Related U.S. Application Data

(60) Provisional application No. 63/190,446, filed on May 19, 2021.

(51) Int. Cl.
*H04W 52/14* (2009.01)
*H04W 72/12* (2009.01)

(52) U.S. Cl.
CPC ..... *H04W 52/146* (2013.01); *H04W 72/1289* (2013.01)

(58) Field of Classification Search
CPC ........... H04W 52/146; H04W 72/1289; H04W 52/04; H04W 52/06; H04W 52/08; H04W 52/10; H04W 52/12; H04W 52/125; H04W 52/14; H04W 52/143; H04W 52/16; H04W 52/18; H04W 52/20; H04W 52/22; H04W 52/221; H04W 52/223; H04W 52/225; H04W 52/226; H04W 52/228; H04W 52/24; H04W 52/241; H04W 52/242; H04W 52/243; H04W 52/244; H04W 52/245; H04W 52/246; H04W 52/247; H04W 52/26; H04W 52/248
See application file for complete search history.

(56) References Cited

FOREIGN PATENT DOCUMENTS

WO 2021212364 10/2021
WO WO-2021212364 A1 * 10/2021

OTHER PUBLICATIONS

Neto, Francisco Hugo Costa, et al. "Uplink power control framework based on reinforcement learning for 5G networks." IEEE Transactions on Vehicular Technology 70.6 (2021): 5734-5748. (Year: 2021).*

* cited by examiner

*Primary Examiner* — Sharad Rampuria
(74) *Attorney, Agent, or Firm* — Skaar Ulbrich Macari, P.A.

(57) ABSTRACT

A method and apparatus are disclosed from the perspective of a User Equipment (UE) in a wireless communication system. In one embodiment, the UE receives a configuration for a first set of power control information and a second set of power control information. The UE also receives a Downlink Control Information (DCI) scheduling one or more Physical Uplink Shared Channels (PUSCHs), wherein the DCI comprises a first Sounding Reference Signal Resource Indicator (SRI) field and a second SRI field, size of the first SRI field is larger than size of the second SRI field, and the first SRI field indicates a number of layers, and wherein the DCI comprises a specific field indicating that the first SRI field is associated with the first set of power control information and the second SRI field is associated with the second set of power control information.

19 Claims, 38 Drawing Sheets

| $\mu$ | $\Delta f = 2^{\mu} \cdot 15 [kHz]$ | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

FIG. 6 (PRIOR ART)

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause 9.3.1 of [10, TS 38.473] |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 9 (PRIOR ART)

| Value of UL/SUL indicator | Uplink |
|---|---|
| 0 | The non-supplementary uplink |
| 1 | The supplementary uplink |

FIG. 10 (PRIOR ART)

| Value of the Redundancy version field | Value of $rv_{id}$ to be applied |
|---|---|
| 00 | 0 |
| 01 | 1 |
| 10 | 2 |
| 11 | 3 |

FIG. 11 (PRIOR ART)

| Bit field mapped to index | PUSCH frequency hopping |
|---|---|
| 0 | Disabled |
| 1 | Enabled |

FIG. 12 (PRIOR ART)

| Bit field mapped to index | Channel Access Type | The CP extension T_"ext" index defined in Clause 5.3.1 of [4, TS 38.211] |
|---|---|---|
| 0 | Type2C-ULChannelAccess defined in [clause 4.2.1.2.3 in 37.213] | 2 |
| 1 | Type2A-ULChannelAccess defined in [clause 4.2.1.2.1 in 37.213] | 3 |
| 2 | Type2A-ULChannelAccess defined in [clause 4.2.1.2.1 in 37.213] | 1 |
| 3 | Type1-ULChannelAccess defined in [clause 4.2.1.1 in 37.213] | 0 |

FIG. 13 (PRIOR ART)

| Bit field mapped to index | Channel Access Type | The CP extension T_"ext" index defined in Clause 5.3.1 of [4, TS 38.211] |
|---|---|---|
| 0 | No sensing as defined in Clause 4.3 in TS 37.213 | 0 |
| 1 | No sensing as defined in Clause 4.3 in TS 37.213 | 2 |
| 2 | 9us sensing within a 25us interval as defined in Clause 4.3 in TS 37.213 | 0 |
| 3 | - | - |

FIG. 14 (PRIOR ART)

| Bit field mapped to index | SRI(s), $N_{SRS}=2$ | Bit field mapped to index | SRI(s), $N_{SRS}=3$ | Bit field mapped to index | SRI(s), $N_{SRS}=4$ |
|---|---|---|---|---|---|
| 0 | 0 | 0 | 0 | 0 | 0 |
| 1 | 1 | 1 | 1 | 1 | 1 |
|  |  | 2 | 2 | 2 | 2 |
|  |  | 3 | reserved | 3 | 3 |

FIG. 15 (PRIOR ART)

| Bit field mapped to index | SRI(s), $N_{SRS}=2$ | Bit field mapped to index | SRI(s), $N_{SRS}=3$ | Bit field mapped to index | SRI(s), $N_{SRS}=4$ |
|---|---|---|---|---|---|
| 0 | 0 | 0 | 0 | 0 | 0 |
| 1 | 1 | 1 | 1 | 1 | 1 |
| 2 | 0,1 | 2 | 2 | 2 | 2 |
| 3 | reserved | 3 | 0,1 | 3 | 3 |
|  |  | 4 | 0,2 | 4 | 0,1 |
|  |  | 5 | 1,2 | 5 | 0,2 |
|  |  | 6-7 | reserved | 6 | 0,3 |
|  |  |  |  | 7 | 1,2 |
|  |  |  |  | 8 | 1,3 |
|  |  |  |  | 9 | 2,3 |
|  |  |  |  | 10-15 | reserved |

FIG. 16 (PRIOR ART)

| Bit field mapped to index | SRI(s), $N_{SRS}=2$ | Bit field mapped to index | SRI(s), $N_{SRS}=3$ | Bit field mapped to index | SRI(s), $N_{SRS}=4$ |
|---|---|---|---|---|---|
| 0 | 0 | 0 | 0 | 0 | 0 |
| 1 | 1 | 1 | 1 | 1 | 1 |
| 2 | 0,1 | 2 | 2 | 2 | 2 |
| 3 | reserved | 3 | 0,1 | 3 | 3 |
|  |  | 4 | 0,2 | 4 | 0,1 |
|  |  | 5 | 1,2 | 5 | 0,2 |
|  |  | 6 | 0,1,2 | 6 | 0,3 |
|  |  | 7 | reserved | 7 | 1,2 |
|  |  |  |  | 8 | 1,3 |
|  |  |  |  | 9 | 2,3 |
|  |  |  |  | 10 | 0,1,2 |
|  |  |  |  | 11 | 0,1,3 |
|  |  |  |  | 12 | 0,2,3 |
|  |  |  |  | 13 | 1,2,3 |
|  |  |  |  | 14-15 | reserved |

FIG. 17 (PRIOR ART)

| Bit field mapped to index | SRI(s), $N_{SRS}=2$ | Bit field mapped to index | SRI(s), $N_{SRS}=3$ | Bit field mapped to index | SRI(s), $N_{SRS}=4$ |
|---|---|---|---|---|---|
| 0 | 0 | 0 | 0 | 0 | 0 |
| 1 | 1 | 1 | 1 | 1 | 1 |
| 2 | 0,1 | 2 | 2 | 2 | 2 |
| 3 | reserved | 3 | 0,1 | 3 | 3 |
| | | 4 | 0,2 | 4 | 0,1 |
| | | 5 | 1,2 | 5 | 0,2 |
| | | 6 | 0,1,2 | 6 | 0,3 |
| | | 7 | reserved | 7 | 1,2 |
| | | | | 8 | 1,3 |
| | | | | 9 | 2,3 |
| | | | | 10 | 0,1,2 |
| | | | | 11 | 0,1,3 |
| | | | | 12 | 0,2,3 |
| | | | | 13 | 1,2,3 |
| | | | | 14 | 0,1,2,3 |
| | | | | 15 | reserved |

FIG. 18 (PRIOR ART)

| Bit field mapped to index | SRI(s), $N_{SRS} = 2$ |
|---|---|
| 0 | 0 |
| 1 | 1 |

FIG. 19 (PRIOR ART)

| Bit field mapped to index | SRI(s), $N_{SRS} = 3$ |
|---|---|
| 0 | 0 |
| 1 | 1 |
| 2 | 2 |
| 3 | Reserved |

FIG. 20 (PRIOR ART)

| Bit field mapped to index | SRI(s), $N_{SRS} = 4$ |
|---|---|
| 0 | 0 |
| 1 | 1 |
| 2 | 2 |
| 3 | 3 |

FIG. 21 (PRIOR ART)

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
|---|---|---|
| 0 | -1 | -4 |
| 1 | 0 | -1 |
| 2 | 1 | 1 |
| 3 | 3 | 4 |

FIG. 22 (PRIOR ART)

| $\mu$ | PUSCH preparation time $N_2$ [symbols] |
|---|---|
| 0 | 10 |
| 1 | 12 |
| 2 | 23 |
| 3 | 36 |

FIG. 23 (PRIOR ART)

| $\mu$ | PUSCH preparation time $N_2$ [symbols] |
|---|---|
| 0 | 5 |
| 1 | 5.5 |
| 2 | 11 for frequency range 1 |

FIG. 24 (PRIOR ART)

| 1st SRI bit field | 2nd SRI bit field |
|---|---|
| N1 bits | N2 bits |

FIG. 27 (PRIOR ART)

1st SRI field

| codepoint (Bit field mapped to index) | SRIs |
|---|---|
| 0 | |
| .. | |
| c_0(x) | SRI (c_0(x)) |
| .. | |
| | |
| c_1(x) | SRI (c_1(x)) |
| | |
| ... | ... |
| | |
| | |
| C_Kx-1(x) | SRI (c_Kx-1(x)) |
| ... | |
| $2^{N1}-1$ | |

2nd SRI field ( for x ports)

| codepoint ( Bit field mapped to index) | SRIs |
|---|---|
| 0 | SRI (c_0(x)) |
| 1 | SRI (c_1(x)) |
| ... | ... |
| Kx-1 | SRI (c_Kx-1(x)) |
| Kx | reserved |
| ... | ... |
| $2^{N2}-1$ | reserved | each entry contains x SRIs

FIG. 28 (PRIOR ART)

| 1st SRI field | | 2nd SRI field | | | | | | | |
|---|---|---|---|---|---|---|---|---|---|
| | | 1st SRI field indicates 1 port or SRI | | 1st SRI field indicates 2 ports or SRIs | | 1st SRI field indicates 3 ports or SRIs | | 1st SRI field indicates 4 ports or SRIs | |
| Bit field mapped to index | SRI(s), $N_{SRS}=4$ | Bit field mapped to index | SRI(s), $N_{SRS}=4$ | Bit field mapped to index | SRI(s), $N_{SRS}=4$ | Bit field mapped to index | SRI(s), $N_{SRS}=4$ | Bit field mapped to index | SRI(s), $N_{SRS}=4$ |
| 0 | 0 | 0 | 0 | 0 | 0,1 | 0 | 0,1,2 | 0 | 0,1,2,3 |
| 1 | 1 | 1 | 1 | 1 | 0,2 | 1 | 0,1,3 | 1 | reserved |
| 2 | 2 | 2 | 2 | 2 | 0,3 | 2 | 0,2,3 | 2 | reserved |
| 3 | 3 | 3 | 3 | 3 | 1,2 | 3 | 1,2,3 | 3 | reserved |
| 4 | 0,1 | 4 | reserved | 4 | 1,3 | 4 | reserved | 4 | reserved |
| 5 | 0,2 | 5 | reserved | 5 | 2,3 | 5 | reserved | 5 | reserved |
| 6 | 0,3 | 6 | reserved | 6 | reserved | 6 | reserved | 6 | reserved |
| 7 | 1,2 | 7 | reserved | 7 | reserved | 7 | reserved | 7 | reserved |
| 8 | 1,3 | | | | | | | | |
| 9 | 2,3 | | | | | | | | |
| 10 | 0,1,2 | | | | | | | | |
| 11 | 0,1,3 | | | | | | | | |
| 12 | 0,2,3 | | | | | | | | |
| 13 | 1,2,3 | | | | | | | | |
| 14 | 0,1,2,3 | | | | | | | | |
| 15 | reserved | | | | | | | | |

FIG. 29 (PRIOR ART)

| 1st TPMI bit field | 2nd TPMI bit field |
|---|---|
| M1 bits | M2 bits |

FIG. 30 (PRIOR ART)

| 1st TPMI field | | 2nd TPMI field | | | | |
|---|---|---|---|---|---|---|
| | | | 1st TPMI indicates 1 layer | 1st TPMI indicates 2 layers | 1st TPMI indicates 3 layers | 1st TPMI indicates 4 layers |
| Bit field mapped to index | codebookSubset = fullyAndPartialAndNonCoherent | Bit field mapped to index | codebookSubset = fullyAndPartialAndNonCoherent | | | |
| 0 | 1 layer: TPMI=0 | 0 | 1 layer: TPMI=0 | 2 layers: TPMI=0 | 3 layers: TPMI=0 | 4 layers: TPMI=0 |
| 1 | 1 layer: TPMI=1 | 1 | 1 layer: TPMI=1 | 2 layers: TPMI=1 | 3 layers: TPMI=1 | 4 layers: TPMI=1 |
| ... | ... | .. | .. | .. | .. | .. |
| 3 | 1 layer: TPMI=3 | 3 | 1 layer: TPMI=3 | 2 layers: TPMI=3 | 3 layers: TPMI=3 | 4 layers: TPMI=3 |
| 4 | 2 layers: TPMI=0 | 4 | 1 layer: TPMI=4 | 2 layers: TPMI=4 | 3 layers: TPMI=4 | 4 layers: TPMI=4 |
| 5 | 2 layers: TPMI=1 | 5 | 1 layer: TPMI=5 | 2 layers: TPMI=5 | 3 layers: TPMI=5 | reserved |
| 6 | 2 layers: TPMI=2 | 6 | 1 layer: TPMI=6 | 2 layers: TPMI=6 | 3 layers: TPMI=6 | reserved |
| ... | ... | .. | ... | ... | reserved | reserved |
| 9 | 2 layers: TPMI=5 | 9 | 1 layer: TPMI=9 | 2 layers: TPMI=9 | reserved | reserved |
| 10 | 3 layers: TPMI=0 | 10 | 1 layer: TPMI=10 | 2 layers: TPMI=10 | reserved | reserved |
| 11 | 4 layers: TPMI=0 | 11 | 1 layer: TPMI=11 | 2 layers: TPMI=11 | reserved | reserved |
| 12 | 1 layer: TPMI=4 | 12 | 1 layer: TPMI=12 | 2 layers: TPMI=12 | reserved | reserved |
| ... | ... | .. | .. | ... | reserved | reserved |
| 19 | 1 layer: TPMI=11 | 19 | 1 layer: TPMI=19 | 2 layers: TPMI=19 | reserved | reserved |
| 20 | 2 layers: TPMI=6 | 20 | 1 layer: TPMI=20 | 2 layers: TPMI=20 | reserved | reserved |
| 21 | 2 layers: TPMI=7 | 21 | 1 layer: TPMI=21 | 2 layers: TPMI=21 | reserved | reserved |
| ... | ... | .. | ... | reserved | reserved | reserved |
| 27 | 2 layers: TPMI=13 | 27 | 1 layer: TPMI=27 | reserved | reserved | reserved |
| 28 | 3 layers: TPMI=1 | 28 | reserved | reserved | reserved | reserved |
| 29 | 3 layers: TPMI=2 | 29 | reserved | reserved | reserved | reserved |
| 30 | 4 layers: TPMI=1 | 30 | reserved | reserved | reserved | reserved |
| 31 | 4 layers: TPMI=2 | 31 | reserved | reserved | reserved | reserved |
| 32 | 1 layers: TPMI=12 | | | | | |
| ... | ... | | | | | |
| 47 | 1 layers: TPMI=27 | | | | | |
| 48 | 2 layers: TPMI=14 | | | | | |
| ... | ... | | | | | |
| 55 | 2 layers: TPMI=21 | | | | | |
| 56 | 3 layers: TPMI=3 | | | | | |
| ... | ... | | | | | |
| 59 | 3 layers: TPMI=6 | | | | | |
| 60 | 4 layers: TPMI=3 | | | | | |
| 61 | 4 layers: TPMI=4 | | | | | |
| 62-63 | reserved | | | | | |

FIG. 31 (PRIOR ART)

| 1st SRI field | | 2nd SRI field | | | | | | |
|---|---|---|---|---|---|---|---|---|
| | | 1st SRI field indicates 1 port or SRI | | 1st SRI field indicates 2 ports or SRIs | | 1st SRI field indicates 3 ports or SRIs | | 1st SRI field indicates 4 ports or SRIs | |
| Bit field mapped to index | SRI(s), $N_{SRS}=4$ | Bit field mapped to index | SRI(s), $N_{SRS}=4$ | Bit field mapped to index | SRI(s), $N_{SRS}=4$ | Bit field mapped to index | SRI(s), $N_{SRS}=4$ | Bit field mapped to index | SRI(s), $N_{SRS}=4$ |
| 0 | 0 | 0 | 0 | 0 | 0,1 | 0 | 0,1,2 | 0 | 0,1,2,3 |
| 1 | 1 | 1 | 1 | 1 | 0,2 | 1 | 0,1,3 | 1 | reserved |
| 2 | 2 | 2 | 2 | 2 | 0,3 | 2 | 0,2,3 | 2 | reserved |
| 3 | 3 | 3 | 3 | 3 | 1,2 | 3 | 1,2,3 | 3 | reserved |
| 4 | 0,1 | 4 | reserved | 4 | 1,3 | 4 | reserved | 4 | reserved |
| 5 | 0,2 | 5 | reserved | 5 | 2,3 | 5 | reserved | 5 | reserved |
| 6 | 0,3 | 6 | reserved | 6 | reserved | 6 | reserved | 6 | reserved |
| 7 | 1,2 | 7 | | 7 | reserved | 7 | reserved | 7 | reserved |
| 8 | 1,3 | | | | | | | | |
| 9 | 2,3 | | | | | | | | |
| 10 | 0,1,2 | | | | | | | | |
| 11 | 0,1,3 | | | | | | | | |
| 12 | 0,2,3 | | | | | | | | |
| 13 | 1,2,3 | | | | | | | | |
| 14 | 0,1,2,3 | | | | | | | | |
| 15 | reserved | | | | | | | | |

FIG. 32

| 1st SRI field | | |
|---|---|---|
| Bit field mapped to index | SRI(s), $N_{SRS}=4$ | SRI-PUSCH-PowerControlId |
| 0 | 0 | 0 |
| 1 | 1 | 1 |
| 2 | 2 | 2 |
| 3 | 3 | 3 |
| 4 | 0,1 | 4 |
| 5 | 0,2 | 5 |
| 6 | 0,3 | 6 |
| 7 | 1,2 | 7 |
| 8 | 1,3 | 8 |
| 9 | 2,3 | 9 |
| 10 | 0,1,2 | 10 |
| 11 | 0,1,3 | 11 |
| 12 | 0,2,3 | 12 |
| 13 | 1,2,3 | 13 |
| 14 | 0,1,2,3 | 14 |
| 15 | reserved | reserved |

FIG. 33A

| 2nd SRI field | | | | | |
|---|---|---|---|---|---|
| 1st SRI field indicates 1 port or SRI | | | 1st SRI field indicates 2 ports or SRIs | | |
| Bit field mapped to index | SRI(s), $N_{SRS}=4$ | SRI-PUSCH-PowerControlId | Bit field mapped to index | SRI(s), $N_{SRS}=4$ | SRI-PUSCH-PowerControlId |
| 0 | 0 | 0 | 0 | 0,1 | 4 |
| 1 | 1 | 1 | 1 | 0,2 | 5 |
| 2 | 2 | 2 | 2 | 0,3 | 6 |
| 3 | 3 | 3 | 3 | 1,2 | 7 |
| 4 | reserved | reserved | 4 | 1,3 | 8 |
| 5 | reserved | reserved | 5 | 2,3 | 9 |
| 6 | reserved | reserved | 6 | reserved | reserved |
| 7 | reserved | reserved | 7 | reserved | reserved |

FIG. 33B

| Bit field mapped to index | 1st SRI field indicates 3 ports or SRIs | | 1st SRI field mapped to index | 2nd SRI field | |
|---|---|---|---|---|---|
| | | | | 1st SRI field indicates 4 ports or SRIs | |
| | SRI(s), $N_{SRS}=4$ | SRI-PUSCH-PowerControlId | | SRI(s), $N_{SRS}=4$ | SRI-PUSCH-PowerControlId |
| 0 | 0,1,2 | 10 | 0 | 0,1,2,3 | 14 |
| 1 | 0,1,3 | 11 | 1 | reserved | reserved |
| 2 | 0,2,3 | 12 | 2 | reserved | reserved |
| 3 | 1,2,3 | 13 | 3 | reserved | reserved |
| 4 | reserved | reserved | 4 | reserved | reserved |
| 5 | reserved | reserved | 5 | reserved | reserved |
| 6 | reserved | reserved | 6 | reserved | reserved |
| 7 | reserved | reserved | 7 | reserved | reserved |

FIG. 33C

| 1st SRI field indicates 1 port or SRS | | 2nd SRI field 1st SRI field indicates 2 ports or SRSs | | 1st SRI field indicates 3 ports or SRSs | | 1st SRI field indicates 4 ports or SRSs | |
|---|---|---|---|---|---|---|---|
| Bit field mapped to index | SRS(s) $N_{SRS}=4$ | Bit field mapped to index | SRS(s) $N_{SRS}=4$ | Bit field mapped to index | SRS(s) $N_{SRS}=4$ | Bit field mapped to index | SRS(s) $N_{SRS}=4$ |
| 0 | 0 | 0 | 0,1 | 0 | 0,1,2 | 0 | 0,1,2,3 |
| 1 | 1 | 1 | 0,2 | 1 | 0,1,3 | 1 | reserved |
| 2 | 2 | 2 | 0,3 | 2 | 0,2,3 | 2 | reserved |
| 3 | 3 | 3 | 1,2 | 3 | 1,2,3 | 3 | reserved |
| 4 | reserved | 4 | 1,3 | 4 | reserved | 4 | reserved |
| 5 | reserved | 5 | 2,3 | 5 | reserved | 5 | reserved |
| 6 | reserved | 6 | reserved | 6 | reserved | 6 | reserved |
| 7 | reserved | 7 | reserved | 7 | reserved | 7 | reserved |

1 subset of power control information may be sri-PUSCH-PathlossReferenceRS-Id, sri-P0-PUSCH-AlphaSetId, and/or sri-PUSCH-ClosedLoopIndex SRI-PUSCH-PowerControl with ID 0: 4 subset of power control information (implicitly) associated to number of ports, respectively or associated by explicitly an port number ID.

SRI-PUSCH-PowerControl with ID 4: 1 subset of power control information (implicitly) associated to number of ports, respectively or associated by explicitly an port number ID.

FIG. 36

| Bit field mapped to index | 1st SRI field indicates 1 port or SRI — SRI(s), $N_{SRS}=4$ | 1st SRI field indicates 2 ports or SRIs — Bit field mapped to index | 1st SRI field indicates 2 ports or SRIs — SRI(s), $N_{SRS}=4$ | 1st SRI field indicates 3 ports or SRIs — Bit field mapped to index | 1st SRI field indicates 3 ports or SRIs — SRI(s), $N_{SRS}=4$ | 1st SRI field indicates 4 ports or SRIs — Bit field mapped to index | 1st SRI field indicates 4 ports or SRIs — SRI(s), $N_{SRS}=4$ | 2nd SRI field Bit field mapped to index | SRI-PUSCH-PowerControlId |
|---|---|---|---|---|---|---|---|---|---|
| 0 | 0 | 0 | 0,1 | 0 | 0,1,2 | 0 | 0,1,2,3 | 0 | 0, 4, 10, 14 |
| 1 | 1 | 1 | 0,2 | 1 | 0,1,3 | 1 | reserved | 1 | 1, 5, 11 |
| 2 | 2 | 2 | 0,3 | 2 | 0,2,3 | 2 | reserved | 2 | 2, 6, 12 |
| 3 | 3 | 3 | 1,2 | 3 | 1,2,3 | 3 | reserved | 3 | 3, 7, 13 |
| 4 | reserved | 4 | 1,3 | 4 | reserved | 4 | reserved | 4 | 8 |
| 5 | reserved | 5 | 2,3 | 5 | reserved | 5 | reserved | 5 | 9 |
| 6 | reserved | 6 | reserved | 6 | reserved | 6 | reserved | | |
| 7 | reserved | 7 | reserved | 7 | reserved | 7 | reserved | | |

FIG. 37 sri-PUSCH-MappingToAddModList (for 1st TRP and 2nd TRP)

| | | | | | | |
|---|---|---|---|---|---|---|
| 1 | SRI-PUSCH-PowerControl | | | | | |
| 2 | | | | | | |
| 3 | | | | | | |
| 4 | | | | | | |
| . | | | | | | |
| . | | | | | | |
| . | | | | | | |
| maxNrofSRI-PUSCH-Mappings for 1st TRP and 2nd TRP (e.g., 32) | SRI-PUSCH-PowerControl | | | | | |

1. Preferably, TRP specific ID/SRS resource set ID (for identifying 1st TRP or 2nd TRP, e.g., 0 for 1st TRP and 1 for 2nd TRP or vice versa)
2. sri-PUSCH-PowerControlId
3. sri-PUSCH-PathlossReferenceRS-Id
4. sri-P0-PUSCH-AlphaSetId
5. sri-PUSCH-ClosedLoopIndex

FIG. 39

| | | 1. sri-PUSCH-PowerControlId |
|---|---|---|
| | | 2. sri-PUSCH-PathlossReferenceRS-Id |
| | | 3. sri-P0-PUSCH-AlphaSetId |
| | | 4. sri-PUSCH-ClosedLoopIndex | sri-PUSCH-MappingToAddModList (for 1st TRP and 2nd TRP)

| | |
|---|---|
| 1 | SRI-PUSCH-PowerControl |
| 2 | |
| 3 | |
| . | |
| 16 | |
| 17 | SRI-PUSCH-PowerControl |
| . | |

1st TRP: rows 1–16

2nd TRP: rows 17–maxNrofSRI-PUSCH-Mappings for 1st TRP and 2nd TRP (e.g., 32)

METHOD AND APPARATUS FOR POWER CONTROL REGARDING MULTI-TRP UPLINK TRANSMISSION IN A WIRELESS COMMUNICATION SYSTEM

CROSS-REFERENCE TO RELATED APPLICATIONS

The present Application claims the benefit of U.S. Provisional Patent Application Ser. No. 63/190,446 filed on May 19, 2021, the entire disclosure of which is incorporated herein in its entirety by reference.

FIELD

This disclosure generally relates to wireless communication networks, and more particularly, to a method and apparatus for power control regarding multi-TRP uplink transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a User Equipment (UE) in a wireless communication system. In one embodiment, the method includes the UE receiving a configuration for a first set of power control information and a second set of power control information. The method also includes the UE receiving a Downlink Control Information (DCI) scheduling one or more Physical Uplink Shared Channels (PUSCHs), wherein the DCI comprises a first Sounding Reference Signal Resource Indicator (SRI) field and a second SRI field, size of the first SRI field is larger than size of the second SRI field, and the first SRI field indicates a number of layers, and wherein the DCI comprises a specific field indicating that the first SRI field is associated with the first set of power control information and the second SRI field is associated with the second set of power control information. The method further includes the UE determining a first Identifier (ID) directly based on value indicated by the first SRI field, wherein the first ID is a power control information ID in the first set of power control information. In addition, the method includes the UE determining a second ID based on a value indicated by the second SRI field and the number of layers, wherein the second ID is a power control information ID in the second set of power control information. Furthermore, the method includes the UE transmitting the one or more PUSCHs based on transmit power derived from the power control information of the first ID or the power control information of the second ID.

BRIEF DESCRIPTION OF THE DRAWINGS

FIG. 6 is a reproduction of Table 5.1-1 of 3GPP TS 38.300 V15.8.0.

FIG. 9 is a reproduction of Table 7.3.1-1 of 3GPP TS 38.212 V16.5.0.

FIG. 10 is a reproduction of Table 7.3.1.1.1-1 of 3GPP TS 38.212 V16.5.0.

FIG. 11 is a reproduction of Table 7.3.1.1.1-2 of 3GPP TS 38.212 V16.5.0.

FIG. 12 is a reproduction of Table 7.3.1.1.1-3 of 3GPP TS 38.212 V16.5.0.

FIG. 13 is a reproduction of Table 7.3.1.1.1-4 of 3GPP TS 38.212 V16.5.0.

FIG. 14 is a reproduction of Table 7.3.1.1.1-4A of 3GPP TS 38.212 V16.5.0.

FIG. 15 is a reproduction of Table 7.3.1.1.2-28 of 3GPP TS 38.212 V16.5.0.

FIG. 16 is a reproduction of Table 7.3.1.1.2-29 of 3GPP TS 38.212 V16.5.0.

FIG. 17 is a reproduction of Table 7.3.1.1.2-30 of 3GPP TS 38.212 V16.5.0.

FIG. 18 is a reproduction of Table 7.3.1.1.2-31 of 3GPP TS 38.212 V16.5.0.

FIG. 19 is a reproduction of Table 7.3.1.1.2-32 of 3GPP TS 38.212 V16.5.0.

FIG. 20 is a reproduction of Table 7.3.1.1.2-32A of 3GPP TS 38.212 V16.5.0.

FIG. 21 is a reproduction of Table 7.3.1.1.2-32B of 3GPP TS 38.212 V16.5.0.

FIG. 22 is a reproduction of Table 7.1.1-1 of 3GPP TS 38.213 V16.5.0.

FIG. 23 is a reproduction of Table 6.4-1 of 3GPP TS 38.214 V16.5.0.

FIG. 24 is a reproduction of Table 6.4-2 of 3GPP TS 38.214 V16.5.0.

FIG. 27 is a reproduction of FIG. 3 of 3GPP R1-2103550.

FIG. 28 is a reproduction of FIG. 4 of 3GPP R1-2103550.

FIG. 29 is a reproduction of FIG. 4 of 3GPP R1-2103550.

FIG. 30 is a reproduction of FIG. 6 of 3GPP R1-2103550.

FIG. 31 is a reproduction of FIG. 7 of 3GPP R1-2103550.

FIG. 32 is a table according to one exemplary embodiment.

FIGS. 33A-33C are tables according to one exemplary embodiment.

FIG. 36 is a table according to one exemplary embodiment.

FIG. 37 is a table according to one exemplary embodiment.

FIG. 39 is a diagram according to one exemplary embodiment.

FIG. 40 is a diagram according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.300 V15.8.0, "NR; NR and NG-RAN Overall Description; Stage 2 (Release 15)"; TS 38.321 V16.4.0, "NR; Medium Access Control (MAC) protocol specification (Release 16)"; TS 38.212 V16.5.0, "NR; Multiplexing and channel coding (Release 16)"; TS 38.213 V16.5.0, "NR; Physical layer procedures for control (Release 16)"; TS 38.214 V16.5.0, "NR; Physical layer procedures for data (Release 16)"; RP-193133, "New WID: Further enhancements on MIMO for NR", Samsung; TS 38.331 V16.4.1, "NR; Radio Resource Control (RRC) protocol specification (Release 16)"; Final Report of 3GPP TSG RAN WG1 #102-e v1.0.0, (Online meeting, 17-28 Aug. 2020); Final Report of 3GPP TSG RAN WG1 #103-e v1.0.0, (Online meeting, 26 Oct.-13 Nov. 2020); R1-2104655, "Enhancements on Multi-TRP for PDCCH, PUCCH and PUSCH", Qualcomm Incorporated; Draft Report of 3GPP TSG RAN WG1 #104-e v0.3.0, (Online meeting, 25 Jan.-5 Feb. 2021); Chairman's Notes RAN1 #104b-e final; and R1-2103550, "On PDCCH, PUCCH and PUSCH enhancements for multi-TRP", Ericsson. The standards and documents listed above are hereby expressly incorporated by reference in their entirety.

Figure 1:
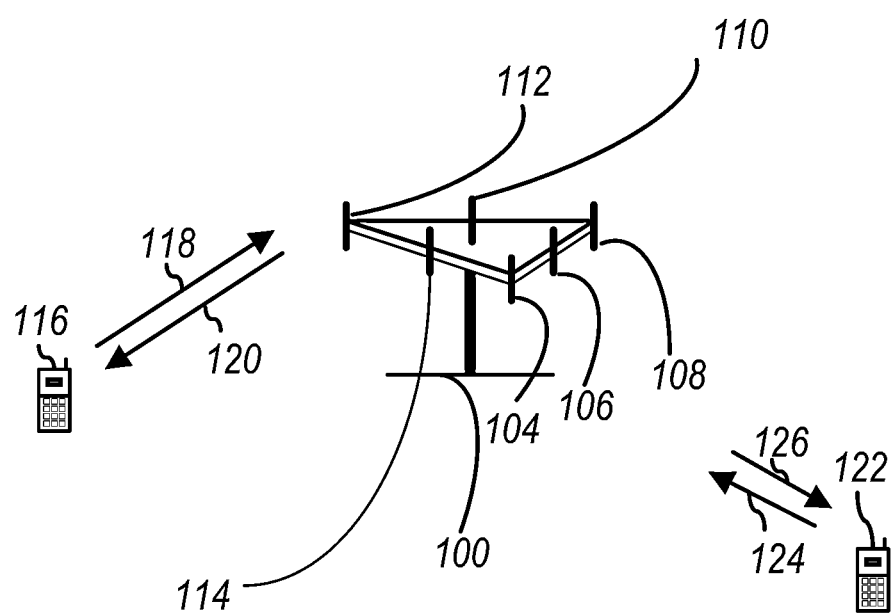
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
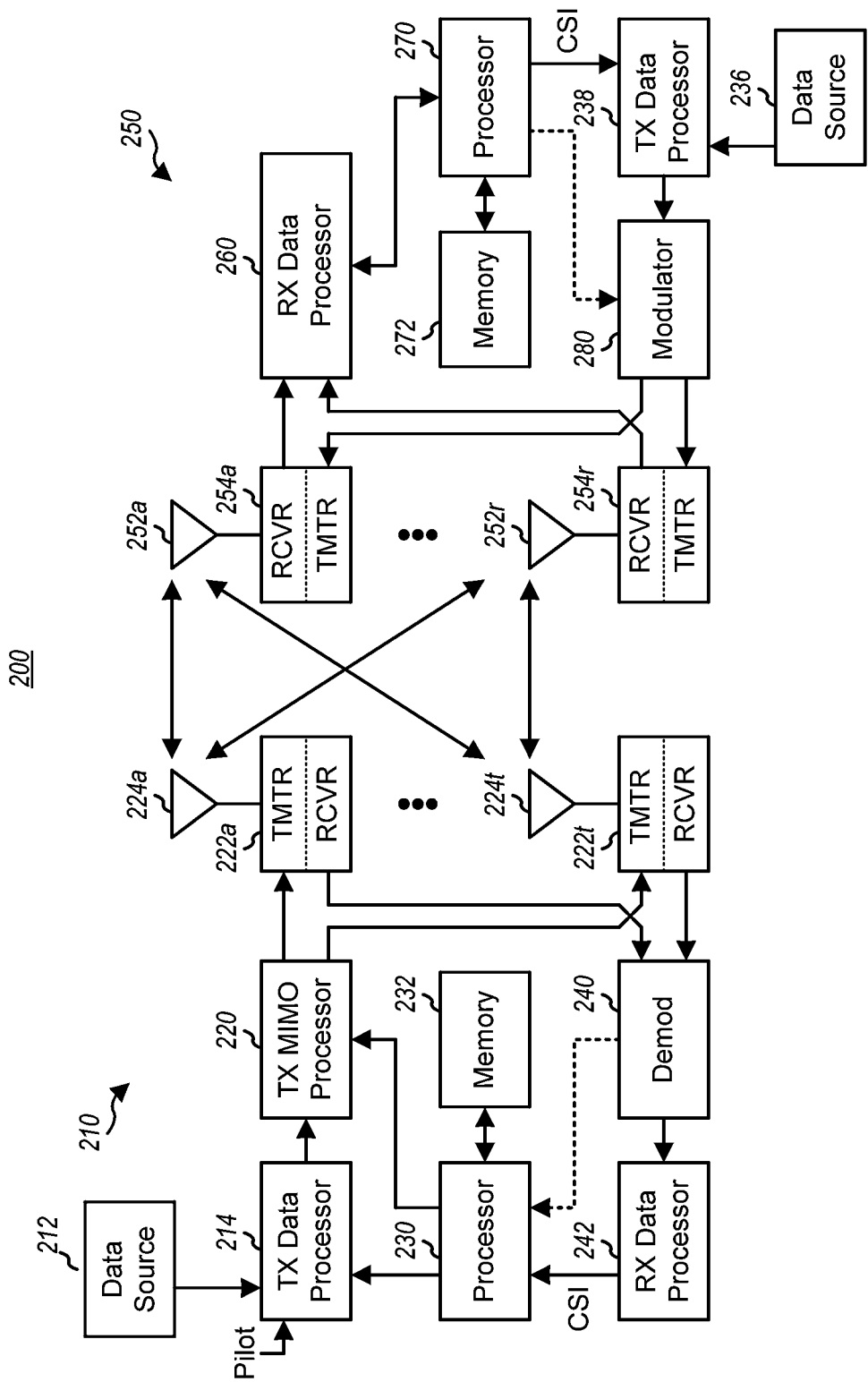
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
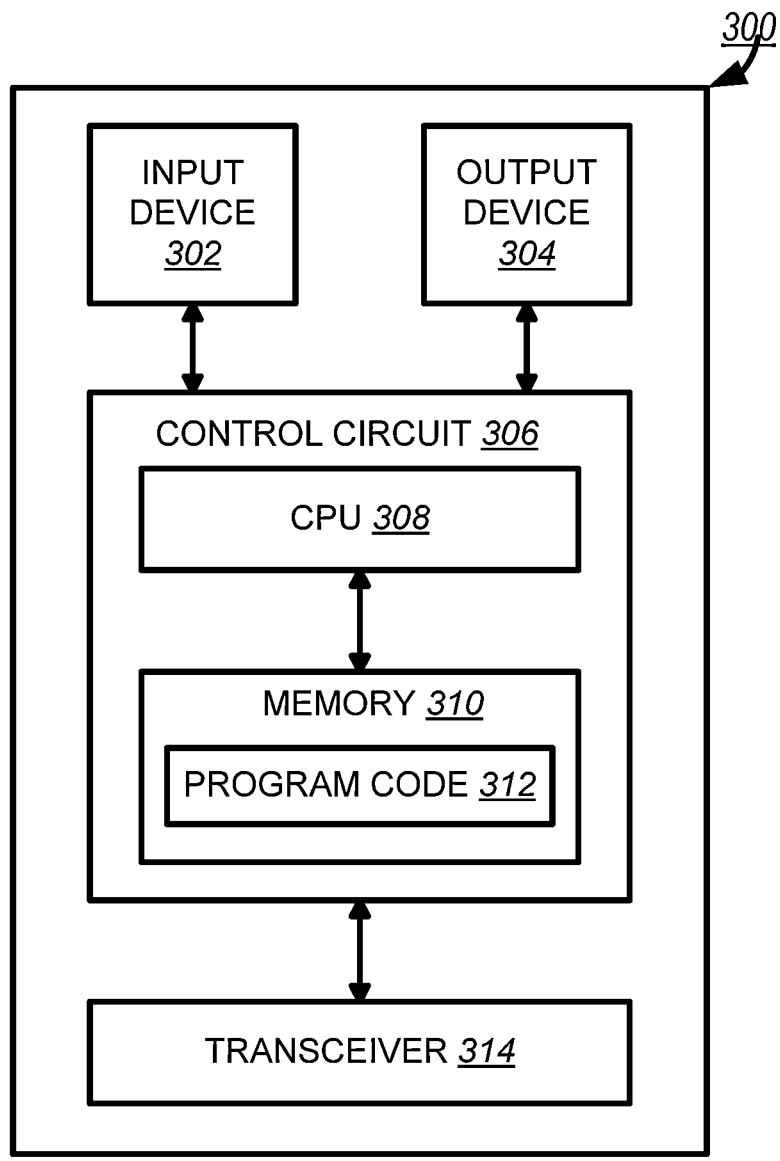
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
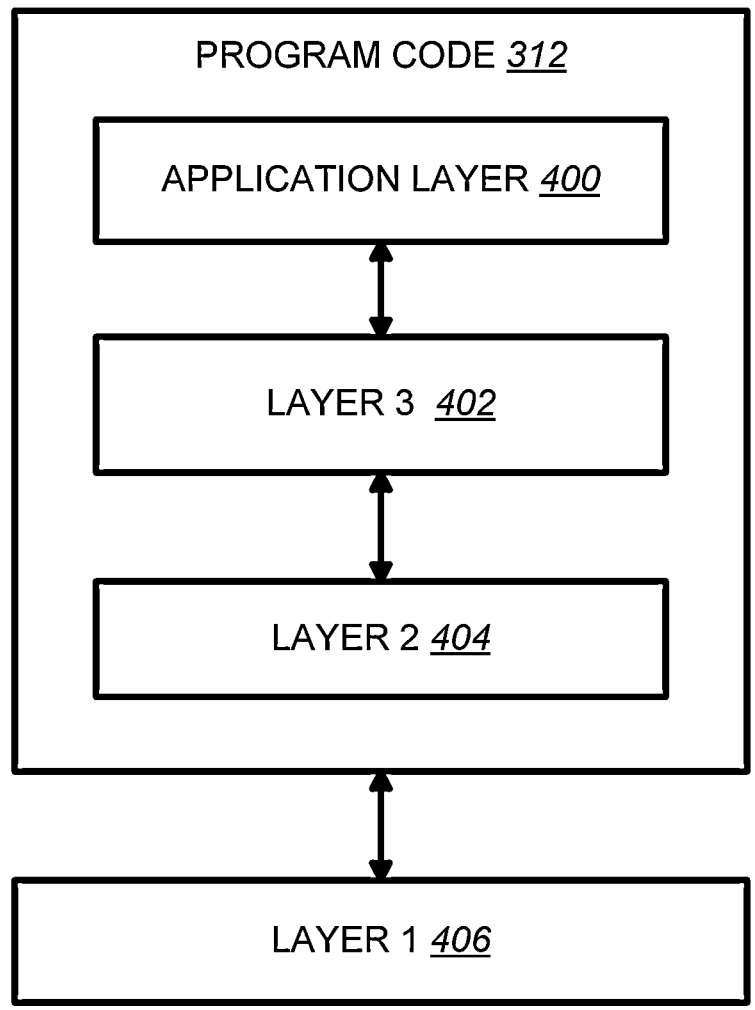
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP 38.300 Rel-15 provides the following text related to NR:

5 Physical Layer 5.1 Waveform, Numerology and Frame Structure

The downlink transmission waveform is conventional OFDM using a cyclic prefix. The uplink transmission waveform is conventional OFDM using a cyclic prefix with a transform precoding function performing DFT spreading that can be disabled or enabled.

Figure 5:
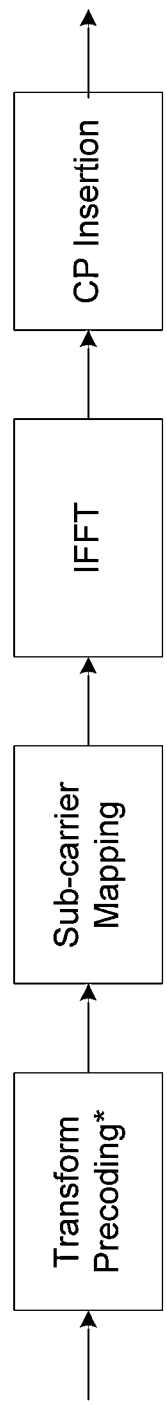
FIG. 5 is a reproduction of FIGS. 5.1-1 of 3GPP TS 38.300 V15.8.0.

FIGS. 5.1-1 of 3GPP TS 38.300 V15.8.0, Entitled
"Transmitter Block Diagram for CP-OFDM with
Optional DFT-Spreading", is Reproduced as FIG. 5

The numerology is based on exponentially scalable subcarrier spacing $\Delta f=2^\mu \times 15$ kHz with $\mu=\{0,1,3,4\}$ for PSS, SSS and PBCH and $\mu=\{0,1,2,3\}$ for other channels. Normal CP is supported for all sub-carrier spacings, Extended CP is supported for $\mu=2$. 12 consecutive sub-carriers form a Physical Resource Block (PRB). Up to 275 PRBs are supported on a carrier.

Table 5.1-1 of 3GPP TS 38.300 V15.8.0, Entitled
"Supported Transmission Numerologies", is
Reproduced as FIG. 6

The UE may be configured with one or more bandwidth parts on a given component carrier, of which only one can be active at a time, as described in clauses 7.8 and 6.10 respectively. The active bandwidth part defines the UE's operating bandwidth within the cell's operating bandwidth. For initial access, and until the UE's configuration in a cell is received, initial bandwidth part detected from system information is used.

Downlink and uplink transmissions are organized into frames with 10 ms duration, consisting of ten 1 ms subframes. Each frame is divided into two equally-sized halfframes of five subframes each. The slot duration is 14 symbols with Normal CP and 12 symbols with Extended CP, and scales in time as a function of the used sub-carrier spacing so that there is always an integer number of slots in a subframe.

Timing Advance TA is used to adjust the uplink frame timing relative to the downlink frame timing.

Figure 7:
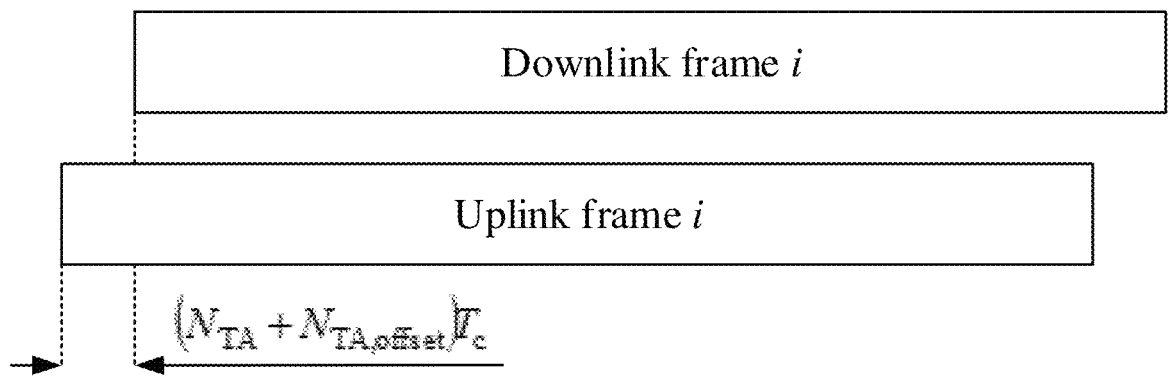
FIG. 7 is a reproduction of FIGS. 5.1-2 of 3GPP TS 38.300 V15.8.0.

FIGS. 5.1-2 of 3GPP TS 38.300 V15.8.0, Entitled
"Uplink-Downlink Timing Relation", is
Reproduced as FIG. 7

Operation on both paired and unpaired spectrum is supported.

Some related texts in NR are provided below from 3GPP TS 38.321 Rel-16. In Rel-17, it has been agreed that Medium Access Control (MAC CE) indicates whether the SRS Resource Indicatior (SRI) IDs are associated to first SRS resource set (associated to a first Transmission/Reception Point (TRP)) and/or second SRS resource set (associated to a second TRP). The two TRPs are associated to one cell. The two TRPs are associated to one uplink Bandwidth Part (BWP).

6.1.3.28 PUSCH Pathloss Reference RS Update MAC CE

The PUSCH Pathloss Reference RS Update MAC CE is identified by a MAC subheader with eLCID as specified in Table 6.2.1-1b. It has a variable size and consists of the following fields:

- Serving Cell ID: This field indicates the identity of the Serving Cell, which contains activated PUSCH Pathloss Reference RS. The length of the field is 5 bits;
- BWP ID: This field indicates a UL BWP as the codepoint of the DCI bandwidth part indicator field as specified in TS 38.212 [9], which contains activated PUSCH Pathloss Reference RS. The length of the field is 2 bits;
- PUSCH Pathloss Reference RS ID: This field indicates the PUSCH Pathloss Reference RS ID identified by PUSCH-PathlossReferenceRS-Id as specified in TS 38.331 [5], which is to be updated in the SRI PUSCH power control mappings indicated by SRI ID fields indicated in the same MAC CE. The length of the field is 6 bits;
- C: This field indicates the presence of the additional SRI ID in the last octet of this MAC CE. If this field is set to 1, two SRI ID(s) are present in the last octet. Otherwise only one SRI ID (i.e. the first SRI ID) is present in the last octet;
- SRI ID: This field indicates the SRI PUSCH power control ID identified by sri-PUSCH-PowerControlId as specified in TS 38.331 [5]. The length of the field is 4 bits;
- R: Reserved bit, set to 0.

Figure 8:
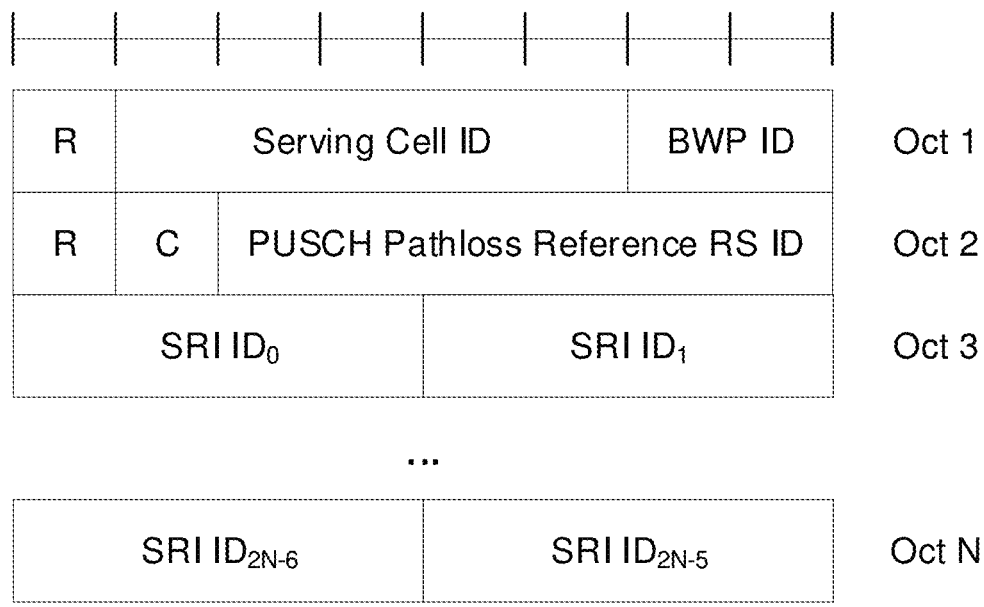
FIG. 8 is a reproduction of FIG. 6.1.3.28-1 of 3GPP TS 38.321 V16.4.0.

FIG. 6.1.3.28-1 of 3GPP TS 38.321 V16.4.0, Entitled "PUSCH Pathloss Reference RS Update MAC CE", is Reproduced as FIG. 8

3GPP TS 38.212 Rel-16 provides the following text related to NR:

Table 7.3.1-1 of 3GPP TS 38.212 V16.5.0, Entitled "DCI Formats", is Reproduced as FIG. 9

7.3.1.1 DCI Formats for Scheduling of PUSCH
7.3.1.1.1 Format 0_0

DCI format 0_0 is used for the scheduling of PUSCH in one cell.

The following information is transmitted by means of the DCI format 0_0 with CRC scrambled by C-RNTI or CS-RNTI or MCS-C-RNTI:

- Identifier for DCI formats—1 bit
  - The value of this bit field is always set to 0, indicating an UL DCI format
- Frequency domain resource assignment—number of bits determined by the following:
  - [ . . . ]
- Time domain resource assignment—4 bits as defined in Clause 6.1.2.1 of [6, TS 38.214]
- Frequency hopping flag—1 bit according to Table 7.3.1.1.1-3, as defined in Clause 6.3 of [6, TS 38.214]
- Modulation and coding scheme—5 bits as defined in Clause 6.1.4.1 of [6, TS 38.214]
- New data indicator—1 bit
- Redundancy version—2 bits as defined in Table 7.3.1.1.1-2
- HARQ process number—4 bits
- TPC command for scheduled PUSCH—2 bits as defined in Clause 7.1.1 of [5, TS 38.213]
- [ . . . ]

Table 7.3.1.1.1-1 of 3GPP TS 38.212 V16.5.0, Entitled "UL/SUL Indicator", is Reproduced as FIG. 10

Table 7.3.1.1.1-2 of 3GPP TS 38.212 V16.5.0, Entitled "Redundancy Version", is Reproduced as FIG. 11

Table 7.3.1.1.1-3 of 3GPP TS 38.212 V16.5.0, Entitled "Frequency Hopping Indication", is Reproduced as FIG. 12

Table 7.3.1.1.1-4 of 3GPP TS 38.212 V16.5.0, Entitled "Channel Access Type & CP Extension for DCI Format 0_0 and DCI Format 1_0", is Reproduced as FIG. 13

Table 7.3.1.1.1-4A of 3GPP TS 38.212 V16.5.0, Entitled "Channel Access Type & CP Extension if ChannelAccessMode-r16='Semistatic' is Provided", is Reproduced as FIG. 14

7.3.1.1.2 Format 0_1

DCI format 0_1 is used for the scheduling of one or multiple PUSCH in one cell, or indicating CG downlink feedback information (CG-DFI) to a UE.

The following information is transmitted by means of the DCI format 0_1 with CRC scrambled by C-RNTI or CS-RNTI or SP-CSI-RNTI or MCS-C-RNTI:

- Identifier for DCI formats—1 bit
  - The value of this bit field is always set to 0, indicating an UL DCI format
- Carrier indicator—0 or 3 bits, as defined in Clause 10.1 of [5, TS38.213].
- DFI flag—0 or 1 bit
- [ . . . ]

If DCI format 0_1 is used for indicating CG-DFI, all the remaining fields are set as follows:

- HARQ-ACK bitmap—16 bits, where the order of the bitmap to HARQ process index mapping is such that HARQ process indices are mapped in ascending order from MSB to LSB of the bitmap. For each bit of the bitmap, value 1 indicates ACK, and value 0 indicates NACK.
- TPC command for scheduled PUSCH—2 bits as defined in Clause 7.1.1 of [5, TS38.213]
- All the remaining bits in format 0_1 are set to zero.

Otherwise, all the remaining fields are set as follows:

UL/SUL indicator—0 bit for UEs not configured with supplementaryUplink in ServingCellConfig in the cell or UEs configured with supplementaryUplink in ServingCellConfig in the cell but only one carrier in the cell is configured for PUSCH transmission; otherwise, 1 bit as defined in Table 7.3.1.1.1-1.

Bandwidth part indicator—0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where $n_{BWP}=n_{BWP,RRC}+1$ if $n_{BWP,RRC} \leq 3$, in which case the bandwidth part indicator is equivalent to the ascending order of the higher layer parameter BWP-Id;

otherwise $n_{BWP}=n_{BWP,RRC}$, in which case the bandwidth part indicator is defined in Table 7.3.1.1.2-1;

If a UE does not support active BWP change via DCI, the UE ignores this bit field.

Frequency domain resource assignment—number of bits determined by the following, where $n_{RB}^{UL,BWP}$ is the size of the active UL bandwidth part:

[ . . . ]

Time domain resource assignment—0, 1, 2, 3, 4, 5, or 6 bits

[ . . . ]

otherwise the bitwidth for this field is determined as $\lceil \log_2(I) \rceil$ bits, where I is the number of entries in the default table.

Frequency hopping flag—0 or 1 bit:

[ . . . ]

Modulation and coding scheme—5 bits as defined in Clause 6.1.4.1 of [6, TS 38.214]

New data indicator—1 bit [ . . . ]

Redundancy version—number of bits determined by the following:

2 bits as defined in Table 7.3.1.1.1-2 if the number of scheduled PUSCH indicated by the Time domain resource assignment field is 1;

[ . . . ]

HARQ process number—4 bits

[ . . . ]

TPC command for scheduled PUSCH—2 bits as defined in Clause 7.1.1 of [5, TS38.213]

SRS resource indicator—

$$\left\lceil \log_2\left( \sum_{k=1}^{\min\{L_{max},N_{SRS}\}} \binom{N_{SRS}}{k} \right) \right\rceil$$

or $\lceil \log_2(N_{SRS}) \rceil$ bits, where $N_{SRS}$ is the number of configured SRS resources in the SRS resource set configured by higher layer parameter srs-ResourceSetToAddModList, and associated with the higher layer parameter usage of value 'codeBook' or 'nonCodeBook', $$\left\lceil \log_2\left( \sum_{k=1}^{\min\{L_{max},N_{SRS}\}} \binom{N_{SRS}}{k} \right) \right\rceil$$

bits according to Tables 7.3.1.1.2-28/29/30/31 if the higher layer parameter txConfig=nonCodebook, where $N_{SRS}$ is the number of configured SRS resources in the SRS resource set configured by higher layer parameter srs-ResourceSetToAddModList, and associated with the higher layer parameter usage of value 'nonCodeBook' and if UE supports operation with maxMIMO-Layers and the higher layer parameter maxMIMO-Layers of PUSCH-ServingCellConfig of the serving cell is configured, $L_{max}$ is given by that parameter otherwise, $L_{max}$ is given by the maximum number of layers for PUSCH supported by the UE for the serving cell for non-codebook based operation.

$\lceil \log_2(N_{SRS}) \rceil$ bits according to Tables 7.3.1.1.2-32, 7.3.1.1.2-32A and 7.3.1.1.2-32B if the higher layer parameter txConfig=codebook, where $N_{SRS}$ is the number of configured SRS resources in the SRS resource set configured by higher layer parameter srs-ResourceSetToAddModList, and associated with the higher layer parameter usage of value 'codeBook'.

[ . . . ]

UL-SCH indicator—0 or 1 bit as follows 0 bit if the number of scheduled PUSCH indicated by the Time domain resource assignment field is larger than 1;

1 bit otherwise. A value of "1" indicates UL-SCH shall be transmitted on the PUSCH and a value of "0" indicates UL-SCH shall not be transmitted on the PUSCH. Except for DCI format 0_1 with CRC scrambled by SP-CSI-RNTI, a UE is not expected to receive a DCI format 0_1 with UL-SCH indicator of "0" and CSI request of all zero(s).

[ . . . ]

Open-loop power control parameter set indication—0 or 1 or 2 bits.

0 bit if the higher layer parameter p0-PUSCH-SetList is not configured;

1 or 2 bits otherwise, 1 bit if SRS resource indicator is present in the DCI format 0_1;

1 or 2 bits as determined by higher layer parameter olpc-ParameterSetDCI-0-1 if SRS resource indicator is not present in the DCI format 0_1.

[ . . . ]

Table 7.3.1.1.2-28 of 3GPP TS 38.212 V16.5.0, Entitled "SRI Indication for Non-Codebook Based PUSCH Transmission, $L_{max}=1$", is Reproduced as FIG. 15

Table 7.3.1.1.2-29 of 3GPP TS 38.212 V16.5.0, Entitled "SRI Indication for Non-Codebook Based PUSCH Transmission, $L_{max}=2$", is Reproduced as FIG. 16

Table 7.3.1.1.2-30 of 3GPP TS 38.212 V16.5.0, Entitled "SRI Indication for Non-Codebook Based PUSCH Transmission, $L_{max}=3$", is Reproduced as FIG. 17

Table 7.3.1.1.2-31 of 3GPP TS 38.212 V16.5.0, Entitled "SRI Indication for Non-Codebook Based PUSCH Transmission, $L_{max}=4$", is Reproduced as FIG. 18

[Table 7.3.1.1.2-32 of 3GPP TS 38.212 V16.5.0, Entitled "SRI Indication for Codebook Based PUSCH Transmission, if Ul-FullPowerTransmission is not Configured, or Ul-FullPowerTransmission=fullpowerMode1, or Ul-FullPowerTransmission=fullpowerMode2, or Ul-FullPowerTransmission=Fullpower and $N_{SRS}=2$", is Reproduced as FIG. 19]

Table 7.3.1.1.2-32A of 3GPP TS 38.212 V16.5.0, Entitled "SRI Indication for Codebook Based PUSCH Transmission, if Ul-FullPowerTransmission=fullpowerMode2 and $N_{SRS}=3$", is Reproduced as FIG. 20

Table 7.3.1.1.2-32B of 3GPP TS 38.212 V16.5.0, Entitled "SRI Indication for Codebook Based PUSCH Transmission, if Ul-FullPowerTransmission=fullpowerMode2 and $N_{SRS}=4$", is Reproduced as FIG. 21

[ . . . ]
7.3.1.1.3 Format 0_2

DCI format 0_2 is used for the scheduling of PUSCH in one cell.

The following information is transmitted by means of the DCI format 0_2 with CRC scrambled by C-RNTI or CS-RNTI or SP-CSI-RNTI or MCS-C-RNTI:

Identifier for DCI formats—1 bit
  The value of this bit field is always set to 0, indicating an UL DCI format
Carrier indicator—0, 1, 2 or 3 bits determined by higher layer parameter carrierIndicatorSizeDCI-0-2, as defined in Clause 10.1 of [5, TS38.213].
UL/SUL indicator—0 bit [ . . . ]
Bandwidth part indicator—0, 1 or 2 bits
[ . . . ]
Frequency domain resource assignment—number of bits determined by the following:
  [ . . . ]
Time domain resource assignment—0, 1, 2, 3, 4, 5 or 6 bits [ . . . ]
Frequency hopping flag—0 or 1 bit:
[ . . . ]
Modulation and coding scheme—5 bits as defined in Clause 6.1.4.1 of [6, TS 38.214]
New data indicator—1 bit
Redundancy version—0, 1 or 2 bits determined by higher layer parameter numberOfBitsForRV-DCI-0-2
  If 0 bit is configured, $rv_{id}$ to be applied is 0;
  1 bit according to Table 7.3.1.2.3-1;
  2 bits according to Table 7.3.1.1.1-2.
HARQ process number—0, 1, 2, 3 or 4 bits determined by higher layer parameter harq-ProcessNumberSizeDCI-0-2
Downlink assignment index—0, 1, 2 or 4 bits
[ . . . ]
TPC command for scheduled PUSCH—2 bits as defined in Clause 7.1.1 of [5, TS38.213]
SRS resource indicator—

$$\left\lceil \log_2\left( \sum_{k=1}^{min\{L_{max},N_{SRS}\}} \binom{N_{SRS}}{k} \right) \right\rceil$$

or $\lceil \log_2 N_{SRS} \rceil$ bits, where $N_{SRS}$ is the number of configured SRS resources in the SRS resource set configured by higher layer parameter srs-ResourceSetToAddModListDCI-0-2, and associated with the higher layer parameter usage of value 'codeBook' or 'nonCodeBook', $$\left\lceil \log_2\left( \sum_{k=1}^{min\{L_{max},N_{SRS}\}} \binom{N_{SRS}}{k} \right) \right\rceil$$

bits according to Tables 7.3.1.1.2-28/29/30/31 if the higher layer parameter txConfig=nonCodebook, where $N_{SRS}$ is the number of configured SRS resources in the SRS resource set configured by higher layer parameter srs-ResourceSetToAddModListDCI-0-2, and associated with the higher layer parameter usage of value 'nonCodeBook' and
  if UE supports operation with maxMIMO-LayersDCI-0-2 and the higher layer parameter maxMIMO-LayersDCI-0-2 of PUSCH-ServingCellConfig of the serving cell is configured, $L_{max}$ is given by that parameter
  otherwise, $L_{max}$ is given by the maximum number of layers for PUSCH supported by the UE for the serving cell for non-codebook based operation.
[$\log_2 N_{SRS}$] bits according to Tables 7.3.1.1.2-32 if the higher layer parameter txConfig=codebook, where $N_{SRS}$ is the number of configured SRS resources in the SRS resource set configured by higher layer parameter srs-ResourceSetToAddModListDCI-0-2, and associated with the higher layer parameter usage of value 'codeBook'.
[ . . . ]
3GPP TS 38.213 Rel-16 provides the following text related to NR:
7.1 Physical Uplink Shared Channel For a PUSCH transmission on active UL BWP b, as described in Clause 12, of carrier f of serving cell c, a UE first calculates a linear value $\hat{P}_{PUSCH,b,f,c}(i, j, q_d, l)$ of the transmit power $P_{PUSCH,b,f,c}(i, j, q_d, l)$, with parameters as defined in Clause 7.1.1.
7.1.1 UE Behaviour If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i, j, q_d, l)$ in PUSCH transmission occasion i as $$P_{PUSCH,b,f,c}(i, j, q_d, l) = \min \begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{b,f,c}(i, l) \end{Bmatrix}$$

where, $P_{CMAX,f,c}(i)$ is the UE configured maximum output power defined in [8-1, TS 38.101-1], [8-2, TS38.101-2] and [8-3, TS38.101-3] for carrier f of serving cell c in PUSCH transmission occasion i.

$P_{O\_PUSCH,b,f,c}(j)$ is a parameter composed of the sum of a component $P_{O\_NOMINAL\_PUSCH,f,c}(j)$ and a component $P_{O\_UE\_PUSCH,b,f,c}(j)$ where $j \in \{0, 1, \ldots, J-1\}$.

[ ... ]

For a PUSCH (re)transmission configured by ConfiguredGrantConfig, j=1, $P_{O\_NOMINAL\_PUSCH,f,c}(1)$ is provided by p0-NominalWithoutGrant, or $P_{O\_NOMINAL\_PUSCH,f,c}(1) = P_{O\_NOMINAL\_PUSCH,f,c}(0)$ if p0-NominalWithoutGrant is not provided, and $P_{O\_UE\_PUSCH,b,f,c}(1)$ is provided by p0 obtained from p0-PUSCH-Alpha in ConfiguredGrantConfig that provides an index P0-PUSCH-AlphaSetId to a set of P0-PUSCH-AlphaSet for active UL BWP b of carrier f of serving cell c For $j \in \{2, \ldots, J-1\} = S_J$, a $P_{O\_NOMINAL\_PUSCH,f,c}(j)$ value, applicable for all $j \in S_J$, is provided by p0-NominalWithGrant, or $P_{O\_NOMINAL\_PUSCH,f,c}(j) = P_{O\_NOMINAL\_PUSCH,f,c}(0)$ if P0-NominalWithGrant is not provided, for each carrier f of serving cell c and a set of $P_{O\_UE\_PUSCH,b,f,c}(j)$ values are provided by a set of p0 in P0-PUSCH-AlphaSet indicated by a respective set of p0-PUSCH-AlphaSetId for active UL BWP b of carrier f of serving cell c If the UE is provided by SRI-PUSCH-PowerControl more than one values of p0-PUSCH-AlphaSetId and if a DCI format scheduling the PUSCH transmission includes an SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the value of $P_{O\_UE\_PUSCH,b,f,c}(j)$ from the p0-PUSCH-AlphaSetId value that is mapped to the SRI field value. If the DCI format also includes an open-loop power control parameter set indication field and a value of the open-loop power control parameter set indication field is '1', the UE determines a value of $P_{O\_UE\_PUSCH,b,f,c}(i)$ from a first value in P0-PUSCH-Set with a p0-PUSCH-SetId value mapped to the SRI field value.

If the PUSCH transmission except for the PUSCH retransmission corresponding to a RAR UL grant is scheduled by a DCI format that does not include an SRI field, or if SRI-PUSCH-PowerControl is not provided to the UE, j=2, If P0-PUSCH-Set is provided to the UE and the DCI format includes an open-loop power control parameter set indication field, the UE determines a value of $P_{O\_UE\_PUSCH,b,f,c}(j)$ from a first P0-PUSCH-AlphaSet in p0-AlphaSets if a value of the open-loop power control parameter set indication field is '0' or '00' a first value in P0-PUSCH-Set with the lowest p0-PUSCH-SetID value if a value of the open-loop power control parameter set indication field is '1' or '01' a second value in P0-PUSCH-Set with the lowest p0-PUSCH-SetID value if a value of the open-loop power control parameter set indication field is '10' else, the UE determines $P_{O\_UE\_PUSCH,b,f,c}(j)$ from the value of the first P0-PUSCH-AlphaSet in p0-AlphaSets For $\alpha_{b,f,c}(j)$ For j=0, if $P_{O\_NOMINAL\_PUSCH,f,c}(0) = P_{O\_PRE} + \Delta_{MsgA\_PUSCH}$ and msgA-Alpha is provided, $\alpha_{b,j,c}(0)$ is the value of msgA-Alpha else if $P_{O\_NOMINAL\_PUSCH,f,c}(0) = P_{O\_PRE} + \Delta_{PREAMBLE\_Msg3}$ or msgA-Alpha is not provided, and msg3-Alpha is provided, $\alpha_{b,f,c}(0)$ is the value of msg3-Alpha else, $\alpha_{b,f,c}(0) = 1$ For j=1, $\alpha_{b,f,c}(1)$ is provided by alpha obtained from p0-PUSCH-Alpha in ConfiguredGrantConfig providing an index P0-PUSCH-AlphaSetId to a set of P0-PUSCH-AlphaSet for active UL BWP b of carrier f of serving cell c For $j \in S_J$, a set of $\alpha_{b,j,c}(j)$ values are provided by a set of alpha in P0-PUSCH-AlphaSet indicated by a respective set of p0-PUSCH-AlphaSetId for active UL BWP b of carrier f of serving cell c If the UE is provided SRI-PUSCH-PowerControl and more than one values of p0-PUSCH-AlphaSetId, and if a DCI format scheduling the PUSCH transmission includes an SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the values of $\alpha_{b,f,c}(j)$ from the p0-PUSCH-AlphaSetId value that is mapped to the SRI field value If the PUSCH transmission except for the PUSCH retransmission corresponding to a RAR UL grant is scheduled by a DCI format that does not include an SRI field, or if SRI-PUSCH-PowerControl is not provided to the UE, j=2, and the UE determines $\alpha_{b,f,c}(j)$ from the value of the first P0-PUSCH-AlphaSet in p0-AlphaSets $M_{RB,b,f,c}^{PUSCH}(i)$ is the bandwidth of the PUSCH resource assignment expressed in number of resource blocks for PUSCH transmission occasion i on active UL BWP b of carrier f of serving cell c and μ is a SCS configuration defined in [4, TS 38.211]

$PL_{b,f,c}(q_d)$ is a downlink pathloss estimate in dB calculated by the UE using reference signal (RS) index $q_d$ for the active DL BWP, as described in Clause 12, of carrier f of serving cell c If the UE is not provided PUSCH-PathlossReferenceRS and enableDefaultBeamPL-ForSRS, or before the UE is provided dedicated higher layer parameters, the UE calculates $PL_{b,f,c}(q_d)$ using a RS resource from an SS/PBCH block with same SS/PBCH block index as the one the UE uses to obtain MIB If the UE is configured with a number of RS resource indexes, up to the value of maxNrofPUSCH-PathlossReferenceRSs, and a respective set of RS configurations for the number of RS resource indexes by PUSCH-PathlossReferenceRS, the set of RS resource indexes can include one or both of a set of SS/PBCH block indexes, each provided by ssb-Index when a value of a corresponding pusch-PathlossReferenceRS-Id maps to a SS/PBCH block index, and a set of CSI-RS resource indexes, each provided by csi-RS-Index when a value of a corresponding pusch-PathlossReferenceRS-Id maps to a CSI-RS resource index. The UE identifies a RS resource index $q_d$ in the set of RS resource indexes to correspond either to a SS/PBCH block index or to a CSI-RS resource index as provided by pusch-PathlossReferenceRS-Id in PUSCH-PathlossReferenceRS If the PUSCH transmission is scheduled by a RAR UL grant as described in Clause 8.3, or for a PUSCH transmission for Type-2 random access procedure as described in Clause 8.1A, the UE uses the same RS resource index $q_d$ as for a corresponding PRACH transmission If the UE is provided SRI-PUSCH-PowerControl and more than one values of PUSCH-PathlossReferenceRS-Id, the UE obtains a mapping from sri-PUSCH-PowerControlId in SRI-PUSCH-PowerControl between a set of values for the SRI field in a DCI format scheduling the PUSCH transmission and a set of PUSCH-PathlossReferenceRS-Id values and determines the RS resource index $q_d$ from the value of PUSCH-PathlossReferenceRS-Id that is mapped to the SRI field value where the RS resource is either on serving cell c or, if provided, on a serving cell indicated by a value of pathlossReferenceLinking If the PUSCH transmission is scheduled by DCI format 0_0, and if the UE is provided a spatial setting by PUCCH-SpatialRelationInfo for a PUCCH resource with a lowest index for active UL BWP b of each carrier f and serving cell c, as described in Clause 9.2.2, the UE uses the same RS resource index $q_d$ as for a PUCCH transmission in the PUCCH resource with the lowest index If the PUSCH transmission is not scheduled by DCI format 0_0, and if the UE is provided enableDefaultBeamPL-ForSRS and is not provided PUSCH-PathlossReferenceRS and PUSCH-PathlossReferenceRS-r16, the UE uses the same RS resource index $q_d$ as for an SRS resource set with an SRS resource associated with the PUSCH transmission If
the PUSCH transmission is scheduled by DCI format 0_0 and the UE is not provided a spatial setting for a PUCCH transmission, or
the PUSCH transmission is scheduled by DCI format 0_1 or DCI format 0_2 that does not include an SRI field, or
SRI-PUSCH-PowerControl is not provided to the UE,
the UE determines a RS resource index $q_d$ with a respective PUSCH-PathlossReferenceRS-Id value being equal to zero where the RS resource is either on serving cell c or, if provided, on a serving cell indicated by a value of pathlossReferenceLinking If
the PUSCH transmission is scheduled by DCI format 0_0 on serving cell c,
the UE is not provided PUCCH resources for the active UL BWP of serving cell c, and
the UE is provided enableDefaultBeamPL-ForPUSCH0-0
the UE determines a RS resource index $q_d$ providing a periodic RS resource configured with qcl-Type set to 'typeD' in the TCI state or the QCL assumption of a CORESET with the lowest index in the active DL BWP of the serving cell c If
the PUSCH transmission is scheduled by DCI format 0_0 on serving cell c,
the UE is not provided a spatial setting for PUCCH resources on the active UL BWP of the primary cell [11, TS 38.321], and
the UE is provided enableDefaultBeamPL-ForPUSCH0-0
the UE determines a RS resource index $q_d$ providing a periodic RS resource configured with qcl-Type set to 'typeD' in the TCI state or the QCL assumption of a CORESET with the lowest index in the active DL BWP of the serving cell c For a PUSCH transmission configured by ConfiguredGrantConfig, if rrc-ConfiguredUplinkGrant is included in ConfiguredGrantConfig, a RS resource index $q_d$ is provided by a value of pathlossReferenceIndex included in rrc-ConfiguredUplinkGrant where the RS resource is either on serving cell c or, if provided, on a serving cell indicated by a value of pathlossReferenceLinking For a PUSCH transmission configured by ConfiguredGrantConfig that does not include rrc-ConfiguredUplinkGrant, the UE determines a RS resource index $q_d$ from a value of PUSCH-PathlossReferenceRS-Id that is mapped to a SRI field value in a DCI format activating the PUSCH transmission. If the DCI format activating the PUSCH transmission does not include an SRI field, the UE determines a RS resource index $q_d$ with a respective PUSCH-PathlossReferenceRS-Id value being equal to zero where the RS resource is either on serving cell c or, if provided, on a serving cell indicated by a value of pathlossReferenceLinking If the UE is provided enablePL-RS-UpdateForPUSCH-SRS, a mapping between sri-PUSCH-PowerControlId and PUSCH-PathlossReferenceRS-Id values can be updated by a MAC CE as described in [11, T538.321]

For a PUSCH transmission scheduled by a DCI format that does not include an SRI field, or for a PUSCH transmission configured by ConfiguredGrantConfig and activated, as described in Clause 10.2, by a DCI format that does not include an SRI field, a RS resource index $q_d$ is determined from the PUSCH-PathlossReferenceRS-Id mapped to sri-PUSCH-PowerControlId=0

$PL_{b,f,c}(q_d)$=referenceSignalPower—higher layer filtered RSRP, where referenceSignalPower is provided by higher layers and RSRP is defined in [7, TS 38.215] for the reference serving cell and the higher layer filter configuration provided by QuantityConfig is defined in [12, TS 38.331] for the reference serving cell If the UE is not configured periodic CSI-RS reception, referenceSignalPower is provided by ss-PBCH-Block-Power. If the UE is configured periodic CSI-RS reception, referenceSignalPower is provided either by ss-PBCH-BlockPower or by powerControlOffsetSS providing an offset of the CSI-RS transmission power relative to the SS/PBCH block transmission power [6, TS 38.214]. If powerControlOffsetSS is not provided to the UE, the UE assumes an offset of 0 dB.

[ . . . ]

For the PUSCH power control adjustment state $f_{b,f,c}(i,l)$ for active UL BWP b of carrier f of serving cell c in PUSCH transmission occasion i $\delta_{PUSCH,b,f,c}(i,l)$ is a TPC command value included in a DCI format that schedules the PUSCH transmission occasion i on active UL BWP b of carrier f of serving cell c or jointly coded with other TPC commands in a DCI format 2_2 with CRC scrambled by TPC-PUSCH-RNTI, as described in Clause 11.3

$l \in \{0,1\}$ if the UE is configured with twoPUSCH-PC-AdjustmentStates and l=0 if the UE is not configured with twoPUSCH-PC-AdjustmentStates or if the PUSCH transmission is scheduled by a RAR UL grant as described in Clause 8.3

For a PUSCH (re)transmission configured by ConfiguredGrantConfig, the value of $l \in \{0,1\}$ is provided to the UE by powerControlLoopToUse If the UE is provided SRI-PUSCH-PowerControl, the UE obtains a mapping between a set of values for the SRI field in a DCI format scheduling the PUSCH transmission and the l value(s) provided by sri-PUSCH-ClosedLoop-Index and determines the l value that is mapped to the SRI field value If the PUSCH transmission is scheduled by a DCI format that does not include an SRI field, or if an SRI-PUSCH-PowerControl is not provided to the UE, l=0

If the UE obtains one TPC command from a DCI format 2_2 with CRC scrambled by a TPC-PUSCH-RNTI, the l value is provided by the closed loop indicator field in DCI format 2_2

$$f_{b,f,c}(i,l) = f_{b,f,c}(i-i_0, l) + \sum_{m=0}^{\mathcal{C}(D_i)-1} \delta_{PUSCH,b,f,c}(m,l)$$

is the PUSCH power control adjustment state l for active UL BWP b of carrier f of serving cell c and PUSCH transmission occasion i if the UE is not provided tpc-Accumulation, where The $\delta_{PUSCH,b,f,c}$ values are given in Table 7.1.1-1

$$\sum_{m=0}^{\mathcal{C}(D_i)-1} \delta_{PUSCH,b,f,c}(m,l)$$

is a sum of TPC command values in a set $D_i$ of TPC command values with cardinality $\mathcal{C}(D_i)$ that the UE receives between $K_{PUSCH}(i-i_0)-1$ symbols before PUSCH transmission occasion $i-i_0$ and $K_{PUSCH}(i)$ symbols before PUSCH transmission occasion i on active UL BWP b of carrier f of serving cell c for PUSCH power control adjustment state l, where $i_0 > 0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i If a PUSCH transmission is scheduled by a DCI format, $K_{PUSCH}(i)$ is a number of symbols for active UL BWP b of carrier f of serving cell c after a last symbol of a corresponding PDCCH reception and before a first symbol of the PUSCH transmission If a PUSCH transmission is configured by ConfiguredGrantConfig, $K_{PUSCH}(i)$ is a number of $K_{PUSCH,min}$ symbols equal to the product of a number of symbols per slot, $N_{symb}^{slot}$, and the minimum of the values provided by k2 in PUSCH-ConfigCommon for active UL BWP b of carrier f of serving cell c If the UE has reached maximum power for active UL BWP b of carrier f of serving cell c at PUSCH transmission occasion $i-i_0$ and $$\sum_{m=0}^{\mathcal{C}(D_i)-1} \delta_{PUSCH,b,f,c}(m,l) \geq 0,$$

then $f_{b,f,c}(i,l) = f_{b,f,c}(i-i_0,l)$

If UE has reached minimum power for active UL BWP b of carrier f of serving cell c at PUSCH transmission occasion $i-i_0$ and $$\sum_{m=0}^{\mathcal{C}(D_i)-1} \delta_{PUSCH,b,f,c}(m,l) \leq 0,$$

then $f_{b,f,c}(i,l) = f_{b,f,c}(i-i_0,l)$

A UE resets accumulation of a PUSCH power control adjustment state l for active UL BWP b of carrier f of serving cell c to $f_{b,f,c}(k,l)=0$, k=0, 1, . . . , i If a configuration for a corresponding $P_{O\_UE\_PUSCH,b,f,c}(j)$ value is provided by higher layers If a configuration for a corresponding $\alpha_{b,f,c}(j)$ value is provided by higher layers where l is determined from the value of j as If j>1 and the UE is provided higher SRI-PUSCH-PowerControl, l is the sri-PUSCH-ClosedLoop-Index value(s) configured in any SRI-PUSCH-PowerControl with the sri-P0-PUSCH-AlphaSetId value corresponding to j If j>1 and the UE is not provided SRI-PUSCH-PowerControl or j=0, l=0

If j=1, l is provided by the value of powerControlLoopToUse $f_{b,f,c}(i,l) = \delta_{PUSCH,b,f,c}(i,l)$ is the PUSCH power control adjustment state for active UL BWP b of carrier f of serving cell c and PUSCH transmission occasion i if the UE is provided tpc-Accumulation, where $\delta_{PUSCH,b,f,c}$ absolute values are given in Table 7.1.1-1

[ . . . ]

[Table 7.1.1-1 of 3GPP TS 38.213 V16.5.0, Entitled "Mapping of TPC Command Field in a DCI Format Scheduling a PUSCH Transmission, or in DCI Format 2_2 with CRC Scrambled by TPC-PUSCH-RNTI, or in DCI Format 2_3, to Absolute and Accumulated $\delta_{PUSCH,b,f,c}$ Values or $\delta_{SRS,b,f,c}$ Values", is Reproduced as FIG. 22]

3GPP TS 38.214 Rel-16 provides the following text related to NR:

6.4 UE PUSCH Preparation Procedure Time

If the first uplink symbol in the PUSCH allocation for a transport block, including the DM-RS, as defined by the slot offset $K_2$ and the start S and length L of the PUSCH allocation indicated by 'Time domain resource assignment' of the scheduling DCI and including the effect of the timing advance, is no earlier than at symbol $L_2$, where $L_2$ is defined as the next uplink symbol with its CP starting $T_{proc,2}$=max$((N_2+d_{2,1}+d_2)(2048+144)\cdot\kappa_2^{-\mu}\cdot T_c+T_{ext}+T_{switch},d_{22})$ after the end of the reception of the last symbol of the PDCCH carrying the DCI scheduling the PUSCH, then the UE shall transmit the transport block.

- $N_2$ is based on μ of Table 6.4-1 and Table 6.4-2 for UE processing capability 1 and 2 respectively, where μ corresponds to the one of $(\mu_{DL}, \mu_{UL})$ resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and κ is defined in clause 4.1 of [4, TS 38.211].
- For operation with shared spectrum channel access, $T_{ext}$ is calculated according to [4, TS 38.211], otherwise $T_{ext}$=0.
- If the first symbol of the PUSCH allocation consists of DM-RS only, then $d_{2,1}$=0, otherwise $d_{2,1}$=1.
- If the UE is configured with multiple active component carriers, the first uplink symbol in the PUSCH allocation further includes the effect of timing difference between component carriers as given in [11, TS 38.133].
- If the scheduling DCI triggered a switch of BWP, $d_{2,2}$ equals to the switching time as defined in [11, TS 38.133], otherwise $d_{2,2}$=0.
- If a PUSCH of a larger priority index would overlap with PUCCH of a smaller priority index, $d_2$ for the PUSCH of a larger priority is set as reported by the UE; otherwise $d_2$=0.
- For a UE that supports capability 2 on a given cell, the processing time according to UE processing capability 2 is applied if the high layer parameter processingType2Enabled in PUSCH-ServingCellConfig is configured for the cell and set to 'enable',
- If the PUSCH indicated by the DCI is overlapping with one or more PUCCH channels, then the transport block is multiplexed following the procedure in clause 9.2.5 of [6, TS 38.213], otherwise the transport block is transmitted on the PUSCH indicated by the DCI.

[ . . . ]

Otherwise the UE may ignore the scheduling DCI.

The value of $T_{proc,2}$ is used both in the case of normal and extended cyclic prefix.

Table 6.4-1 of 3GPP TS 38.214 V16.5.0, Entitled "PUSCH Preparation Time for PUSCH Timing Capability 1", is Reproduced as FIG. 23

Table 6.4-2 of 3GPP TS 38.214 V16.5.0, Entitled "PUSCH Preparation Time for PUSCH Timing Capability 2", is Reproduced as FIG. 24

3GPP RP-193133 provides the following content related to Rel-17 FeMIMO work item:

4 Objective 4.1 Objective of SI or Core Part WI or Testing Part WI

[ . . . ]

2. Enhancement on the support for multi-TRP deployment, targeting both FR1 and FR2:
   a. Identify and specify features to improve reliability and robustness for channels other than PDSCH (that is, PDCCH, PUSCH, and PUCCH) using multi-TRP and/or multi-panel, with Rel.16 reliability features as the baseline 3GPP TS 38.331 states:

PhysCellId

The PhysCellId identifies the physical cell identity (PCI).

PhysCellId Information Element

```
-- ASN1START
-- TAG-PHYSCELLID-START
PhysCellId ::=                    INTEGER (0..1007)
--TAG-PHYSCELLID-STOP
-- ASN1STOP
```

ServCellIndex

The IE ServCellIndex concerns a short identity, used to identify a serving cell (i.e. the PCell, the PSCell or an SCell). Value 0 applies for the PCell, while the SCellIndex that has previously been assigned applies for SCells.

ServCellIndex Information Element

```
-- ASN1START
-- TAG-SERVCELLINDEX-START
ServCellIndex ::=                 INTEGER (0..maxNrofServingCells-1)
-- TAG-SERVCELLINDEX-STOP
-- ASN1STOP
```

TCI-State

The IE TCI-State associates one or two DL reference signals with a corresponding quasi-colocation (QCL) type.

TCI-State Information Element

```
-- ASN1START
-- TAG-TCI-STATE-START
TCI-State ::=                       SEQUENCE {
    tci-StateId                         TCI-StateId,
    qcl-Type1                           QCL-Info,
    qcl-Type2                           QCL-Info
OPTIONAL, -- Need P
    ...
}
QCL-Info ::=                        SEQUENCE {
    cell                                ServCellIndex
OPTIONAL, -- Need R
    bwp-Id                              BWP-Id
OPTIONAL, -- Cond CSI-RS-Indicated
    referenceSignal                     CHOICE {
        csi-rs                              NZP-CSI-RS-ResourceId,
        ssb                                 SSB-Index
    },
    qcl-Type                            ENUMERATED {typeA, typeB, typeC, typeD},
    ...
}
-- TAG-TCI-STATE-STOP
-- ASN1STOP
```

| QCL-Info field descriptions |
| --- |
| bwp-Id |
| The DL BWP which the RS is located in. |
| cell |
| The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. See TS 38.214 [19] clause 5.1.5. |
| referenceSignal |
| Reference signal with which quasi-collocation information is provided as specified in TS 38.214 [19] subclause 5.1.5. |
| qcl-Type |
| QCL type as specified in TS 38.214 [19] subclause 5.1.5. |

PUSCH-PowerControl
The IE PUSCH-PowerControl is used to configure UE specific power control parameter for PUSCH.

PUSCH-PowerControl Information Element

```
-- ASN1START
-- TAG-PUSCH-POWERCONTROL-START
PUSCH-PowerControl ::=              SEQUENCE {
    tpc-Accumulation                    ENUMERATED { disabled }
OPTIONAL, -- Need S
    msg3-Alpha                          Alpha
OPTIONAL, -- Need S
    p0-NominalWithoutGrant              INTEGER (-202..24)
OPTIONAL, -- Need M
    p0-AlphaSets                        SEQUENCE (SIZE (1..maxNrofP0-PUSCH-AlphaSets)) OF P0-
PUSCH-AlphaSet          OPTIONAL, -- Need M
    pathlossReferenceRSToAddModList     SEQUENCE (SIZE (1..maxNrofPUSCH-PathlossReferenceRSs)) OF
PUSCH-PathlossReferenceRS
OPTIONAL, -- Need N
    pathlossReferenceRSToReleaseList    SEQUENCE (SIZE (1..maxNrofPUSCH-PathlossReferenceRSs)) OF
PUSCH-PathlossReferenceRS-Id
OPTIONAL, -- Need N
    twoPUSCH-PC-AdjustmentStates        ENUMERATED {twoStates}
OPTIONAL, -- Need S
    deltaMCS                            ENUMERATED {enabled}
```

```
OPTIONAL, -- Need S
    sri-PUSCH-MappingToAddModList            SEQUENCE (SIZE (1..maxNrofSRI-PUSCH-Mappings)) OF SRI-
PUSCH-PowerControl
OPTIONAL, -- Need N
    sri-PUSCH-MappingToReleaseList           SEQUENCE (SIZE (1..maxNrofSRI-PUSCH-Mappings)) OF SRI-
PUSCH-PowerControlId
OPTIONAL, -- Need N
}
P0-PUSCH-AlphaSet ::=                        SEQUENCE {
    p0-PUSCH-AlphaSetId                          P0-PUSCH-AlphaSetId,
    p0                                           INTEGER (-16..15)
OPTIONAL, -- Need S
    alpha                                        Alpha
OPTIONAL, -- Need S
}
P0-PUSCH-AlphaSetId ::=                      INTEGER (0..maxNrofP0-PUSCH-AlphaSets-1)
PUSCH-PathlossReferenceRS ::=                SEQUENCE {
    pusch-PathlossReferenceRS-Id                 PUSCH-PathlossReferenceRS-Id,
    referenceSignal                              CHOICE {
        ssb-Index                                    SSB-Index,
        csi-RS-Index                                 NZP-CSI-RS-ResourceId
    }
}
PUSCH-PathlossReferenceRS-r16 ::=            SEQUENCE {
    pusch-PathlossReferenceRS-Id-r16             PUSCH-PathlossReferenceRS-Id-v1610,
    referenceSignal-r16                          CHOICE {
        ssb-Index-r16                                SSB-Index,
        csi-RS-Index-r16                             NZP-CSI-RS-ResourceId
    }
}
PUSCH-PathlossReferenceRS-Id ::=             INTEGER (0..maxNrofPUSCH-PathlossReferenceRSs-1)
PUSCH-PathlossReferenceRS-Id-v1610 ::= INTEGER (maxNrofPUSCH-PathlossReferenceRSs..maxNrofPUSCH-
PathlossReferenceRSs-1-r16)
SRI-PUSCH-PowerControl ::=                   SEQUENCE {
    sri-PUSCH-PowerControlId                     SRI-PUSCH-PowerControlId,
    sri-PUSCH-PathlossReferenceRS-Id             PUSCH-PathlossReferenceRS-Id,
    sri-P0-PUSCH-AlphaSetId                      P0-PUSCH-AlphaSetId,
    sri-PUSCH-ClosedLoopIndex                    ENUMERATED { i0, i1 }
}
SRI-PUSCH-PowerControlId ::=                 INTEGER (0..maxNrofSRI-PUSCH-Mappings-1)
PUSCH-PowerControl-v1610 ::=                 SEQUENCE {
    pathlossReferenceRSToAddModListSizeExt-v1610          SEQUENCE (SIZE (1..maxNrofPUSCH-
PathlossReferenceRSsDiff-r16)) OF PUSCH-PathlossReferenceRS-r16
OPTIONAL, -- Need N
    pathlossReferenceRSToReleaseListSizeExt-v1610         SEQUENCE (SIZE (1..maxNrofPUSCH-
PathlossReferenceRSsDiff-r16)) OF PUSCH-PathlossReferenceRS-Id-v1610
OPTIONAL, -- Need N
    p0-PUSCH-SetList-r16                     SEQUENCE (SIZE (1..maxNrofSRI-PUSCH-Mappings)) OF P0-
PUSCH-Set-r16            OPTIONAL, -- Need P
    olpc-ParameterSet                            SEQUENCE {
        olpc-ParameterSetDCI-0-1-r16                 INTEGER (1..2)
OPTIONAL, -- Need P
        olpc-ParameterSetDCI-0-2-r16                 INTEGER (1..2)
OPTIONAL, -- Need P
    }
OPTIONAL, -- Need M
    ...
}
P0-PUSCH-Set-r16 ::=                         SEQUENCE {
    p0-PUSCH-SetId-r16                           P0-PUSCH-SetId-r16,
    p0-List-r16                                  SEQUENCE (SIZE (1..maxNrofP0-PUSCH-Set-r16)) OF P0-PUSCH-
r16             OPTIONAL, -- Need R
    ...
}
P0-PUSCH-SetId-r16 ::=                       INTEGER (0..maxNrofSRI-PUSCH-Mappings-1)
P0-PUSCH-r16 ::=                             INTEGER (-16..15)
-- TAG-PUSCH-POWERCONTROL-STOP
-- ASN1STOP
```

| P0-PUSCH-AlphaSet field descriptions |
| --- |
| alpha |
| alpha value for PUSCH with grant (except msg3) (see TS 38.213 [13], clause 7.1). When the field is absent the UE applies the value 1. |
| p0 |
| P0 value for PUSCH with grant (except msg3) in steps of 1 dB (see TS 38.213 [13], clause 7.1). When the field is absent the UE applies the value 0. |

| P0-PUSCH-Set field descriptions |
| --- |
| p0-List |
| Configuration of {p0-PUSCH, p0-PUSCH} sets for PUSCH. If SRI is present in the DCI, then one p0-PUSCH can be configured in P0-PUSCH-Set. If SRI is not present in the DCI, and both olpc-ParameterSetDCI-0-1 and olpc-ParameterSetDCI-0-2 are configured to be 1 bit, then one p0-PUSCH can be configured in P0-PUSCH-Set. If SRI is not present in the DCI, and if any of olpc-ParameterSetDCI-0-1 and olpc-ParameterSetDCI-0-2 is configured to be 2 bits, then two p0-PUSCH values can be configured in P0-PUSCH-Set (see TS 38.213 [13] clause 7 and TS 38.212 [17] clause 7.3.1). |
| p0-PUSCH-SetId |
| Configure the index of a p0-PUSCH-Set (see TS 38.213 [13] clause 7 and TS 38.212 [17] clause 7.3.1). |

| PUSCH-PowerControl field descriptions |
| --- |
| deltaMCS |
| Indicates whether to apply delta MCS. When the field is absent, the UE applies Ks = 0 in delta_TFC formula for PUSCH (see TS 38.213 [13], clause 7.1). |
| msg3-Alpha |
| Dedicated alpha value for msg3 PUSCH (see TS 38.213 [13], clause 7.1). When the field is absent the UE applies the value 1. |
| olpc-ParameterSetDCI-0-1, olpc-ParameterSetDCI-0-2 |
| Configures the number of bits for Open-loop power control parameter set indication for DCI format 0_1/0_2 in case SRI is not configured in the DCI. 2 bits is applicable only if SRI is not present in the DCI format 0_1. The field olpc-ParameterSetDCI-0-1 applies to DCI format 0_1 and the field olpc-ParameterSetDCI-0-2 applies to DCI format 0_2 (see TS 38.212 [17], clause 7.3.1 and TS 38.213 [13], clause 11). |
| p0-AlphaSets |
| configuration {p0-pusch, alpha} sets for PUSCH (except msg3), i.e., {{p0,alpha,index1}, {p0,alpha,index2},...} (see TS 38.213 [13], clause 7.1). When no set is configured, the UE uses the P0-nominal for msg3 PUSCH, P0-UE is set to 0 and alpha is set according to msg3-Alpha configured for msg3 PUSCH. |
| p0-NominalWithoutGrant |
| P0 value for UL grant-free/SPS based PUSCH. Value in dBm. Only even values (step size 2) allowed (see TS 38.213 [13], clause 7.1). |
| p0-PUSCH-SetList |
| Configure one additional P0-PUSCH-Set per SRI. If present, the one bit or 2 bits in the DCI is used to dynamically indicate among the P0 value from the existing P0-PUSCH-AlphaSet and the P0 value(s) from the P0-PUSCH-Set (See TS 38.212 [17], clause 7.3.1 and TS 38.213 [13], clause 17). |
| pathlossReferenceRSToAddModList, pathlossReferenceRSToAddModListSizeExt |
| A set of Reference Signals (e.g. a CSI-RS config or a SS block) to be used for PUSCH path loss estimation. The set consists of Reference Signals configured using pathLossReferenceRSToAddModList and Reference Signals configured using pathlossReferenceRSToAddModListSizeExt.Up to maxNrofPUSCH-PathlossReferenceRSs may be configured (see TS 38.213 [13], clause 7.1). |
| pathlossReferenceRSToReleaseList, pathlossReferenceRSToReleaseListSizeExt |
| Lists of reference symbols for PUSCH path loss estimation to be released by the UE. |
| sri-PUSCH-MappingToAddModList |
| A list of SRI-PUSCH-PowerControl elements among which one is selected by the SRI field in DCI (see TS 38.213 [13], clause 7.1). |
| tpc-Accumulation |
| If enabled, UE applies TPC commands via accumulation. If not enabled, UE applies the TPC command without accumulation. If the field is absent, TPC accumulation is enabled (see TS 38.213 [13], clause 7.1). |
| twoPUSCH-PC-AdjustmentStates |
| Number of PUSCH power control adjustment states maintained by the UE (i.e., fc(i)). If the field is present (n2) the UE maintains two power control states (i.e., fc(i,0) and fc(i,1)). If the field is absent, it maintains one power control state (i.e., fc(i,0)) (see TS 38.213 [13], clause 7.1). |

| SRI-PUSCH-PowerControl field descriptions | |
|---|---|
| sri-P0-PUSCH-AlphaSetId | |
| The ID of a P0-PUSCH-AlphaSet as configured in p0-AlphaSets in PUSCH-PowerControl. | 5 |
| sri-PUSCH-ClosedLoopIndex | |
| The index of the closed power control loop associated with this SRI-PUSCH-PowerControl. | |
| sri-PUSCH-PathlossReferenceRS-Id | 10 |
| The ID of PUSCH-PathlossReferenceRS as configured in the pathlossReferenceRSToAddModList in PUSCH-PowerControl. | |
| sri-PUSCH-PowerControlId | |
| The ID of this SRI-PUSCH-PowerControl configuration. It is used as the codepoint (payload) in the SRI DCI field. | 15 |

SRS-Config

The IE SRS-Config is used to configure sounding reference signal transmissions. The configuration defines a list of SRS-Resources and a list of SRS-ResourceSets. Each resource set defines a set of SRS-Resources. The network triggers the transmission of the set of SRS-Resources using a configured aperiodicSRS-ResourceTrigger (L1 DCI).

SRS-Config Information Element

```
-- ASN1START
-- TAG-SRS-CONFIG-START
SRS-Config ::=                              SEQUENCE {
    srs-ResourceSetToReleaseList                SEQUENCE (SIZE (1..maxNrofSRS-ResourceSets)) OF SRS-
ResourceSetId             OPTIONAL, -- Need N
    srs-ResourceSetToAddModList                 SEQUENCE (SIZE(1..maxNrofSRS-ResourceSets)) OF SRS-
ResourceSet               OPTIONAL, -- Need N
    srs-ResourceToReleaseList                   SEQUENCE (SIZE(1..maxNrofSRS-Resources)) OF SRS-
ResourceId                OPTIONAL, -- Need N
    srs-ResourceToAddModList                    SEQUENCE (SIZE(1..maxNrofSRS-Resources)) OF SRS-
Resource                  OPTIONAL, -- Need N
    tpc-Accumulation                            ENUMERATED {disabled}
OPTIONAL, -- Need S
    ...,
    [[
    srs-RequestDCI-1-2-r16                      INTEGER (1..2)
OPTIONAL, -- Need S
    srs-RequestDCI-0-2-r16                      INTEGER (1..2)
OPTIONAL, -- Need S
    srs-ResourceSetToAddModListDCI-0-2-r16      SEQUENCE (SIZE(1..maxNrofSRS-ResourceSets)) OF SRS-
ResourceSet               OPTIONAL, -- Need N
    srs-ResourceSetToReleaseListDCI-0-2-r16     SEQUENCE (SIZE(1..maxNrofSRS-ResourceSets)) OF SRS-
ResourceSetId             OPTIONAL, -- Need N
[...]
}
SRS-ResourceSet ::=                         SEQUENCE {
    srs-ResourceSetId                           SRS-ResourceSetId,
    srs-ResourceIdList                          SEQUENCE SIZE(1..maxNrofSRS-ResourcesPerSet)) OF
SRS-ResourceId      OPTIONAL, -- Cond Setup
    resourceType                                CHOICE {
        aperiodic                                   SEQUENCE {
            aperiodicSRS-ResourceTrigger                INTEGER (1..maxNrofSRS-TriggerStates-1),
            csi-RS                                      NZP-CSI-RS-ResourceId
OPTIONAL, -- Cond NonCodebook
            slotOffset                                  INTEGER (1..32)
OPTIONAL, -- Need S
            ...,
            [[
            aperiodicSRS-ResourceTriggerList                    SEQUENCE (SIZE(1..maxNrofSRS-
TriggerStates-2))
                                                                OF INTEGER (1..maxNrofSRS-
TriggerStates-1)       OPTIONAL -- Need N
            ]]
        },
        semi-persistent                             SEQUENCE {
            associatedCSI-RS                            NZP-CSI-RS-ResourceId
```

```
        OPTIONAL, -- Cond NonCodebook
            ...
        },
        periodic                                           SEQUENCE {
            associatedCSI-RS                                   NZP-CSI-RS-ResourceId
OPTIONAL, -- Cond NonCodebook
            ...
        }
    },
    usage                                               ENUMERATED {beamManagement, codebook, nonCodebook,
antennaSwitching},
    alpha                                               Alpha
OPTIONAL, -- Need S
    p0                                                  INTEGER (-202..24)
OPTIONAL, -- Cond Setup
    pathlossReferenceRS                                 PathlossReferenceRS-Config
OPTIONAL, -- Need M
    srs-PowerControlAdjustmentStates                    ENUMERATED { sameAsFci2, separateClosedLoop}
OPTIONAL, -- Need S
    ...,
    [[
    pathlossReferenceRSList-r16                         SetupRelease { PathlossReferenceRSList-r16}
OPTIONAL -- Need M
    ]]
}
PathlossReferenceRS-Config ::=                          CHOICE {
    ssb-Index                                               SSB-Index,
    csi-RS-Index                                            NZP-CSI-RS-ResourceId
}
PathlossReferenceRSList-r16 ::=                         SEQUENCE (SIZE (1..maxNrofSRS-PathlossReferenceRS-
r16)) OF PathlossReferenceRS-r16
PathlossReferenceRS-r16 ::=                             SEQUENCE {
    srs-PathlossReferenceRS-Id-r16,                         SRS-PathlossReferenceRS-Id-r16,
    pathlossReferenceRS-r16                                 PathlossReferenceRS-Config
}
SRS-PathlossReferenceRS-Id-r16 ::=                      INTEGER (0..maxNrofSRS-PathlossReferenceRS-1-r16)
[...]
SRS-ResourceSetId ::=                               INTEGER (0..maxNrofSRS-ResourceSets-1)
[...]
SRS-Resource ::=                                    SEQUENCE {
    srs-ResourceId                                      SRS-ResourceId,
    nrofSRS-Ports                                       ENUMERATED {port1, ports2, ports 4},
    ptrs-PortIndex                                      ENUMERATED {n0, n1 }
OPTIONAL, -- Need R
    transmissionComb                                    CHOICE {
        n2                                                  SEQUENCE {
            combOffset-n2                                       INTEGER (0..1),
            cyclicShift-n2                                      INTEGER (0..7)
        },
        n4                                                  SEQUENCE {
            combOffset-n4                                       INTEGER (0..3),
            cyclicShift-n4                                      INTEGER (0..11)
        }
    },
    resourceMapping                                     SEQUENCE {
        startPosition                                       INTEGER (0..5),
        nrofSymbols                                         ENUMERATED {n1, n2, n4},
        repetitionFactor                                    ENUMERATED {n1, n2, n4}
    },
    freqDomainPosition                                  INTEGER (0..67),
    freqDomainShift                                     INTEGER (0..268),
    freqHopping                                         SEQUENCE {
        c-SRS                                               INTEGER (0..63),
        b-SRS                                               INTEGER (0..3),
        b-hop                                               INTEGER (0..3)
    },
    groupOrSequenceHopping                              ENUMERTED { neither, groupHopping, sequenceHopping
},
    resourceType                                        CHOICE {
        aperiodic                                           SEQUENCE {
            ...
        },
        semi-persistent                                     SEQUENCE {
            periodicityAndOffset-sp                             SRS-PeriodicityAndOffset,
            ...
        },
        periodic                                            SEQUENCE {
            periodicityAndOffset-p                              SRS-PeriodicityAndOffset,
            ...
```

```
        }
    },
    sequenceId                          INTEGER (0..1023),
    spatialRelationInfo                 SRS-SpatialRelationInfo
OPTIONAL, -- Need P
    ...,
    [[
    resourceMapping-r16                 SEQUENCE {
        startPosition-r16                   INTEGER (0..13),
        nrofSymbols-r16                     ENUMERATED {n1, n2, n4},
        repetitionFactor-r16                ENUMERATED {n1, n2, n4}
    }
OPTIONAL -- Need R
    ]]
}
[...]
SRS-SpatialRelationInfo ::=         SEQUENCE {
    servingCellId                       ServCellIndex
OPTIONAL, -- Need S
    referenceSignal                     CHOICE {
        ssb-Index                           SSB-Index,
        csi-RS-Index                        NZP-CSI-RS-ResourceId,
        srs                                 SEQUENCE {
            resourceId                          SRS-ResourceId,
            uplinkBWP                           BWP-Id
        }
    }
}
[...]
SSB-Configuration-r16 ::=           SEQUENCE {
    ssb-Freq-r16                        ARFCN-ValueNR,
    halfFrameIndex-r16                  ENUMERATED {zero, one},
    ssbSubcarrierSpacing-r16            SubcarrierSpacing,
    ssb-Periodicity-r16                 ENUMERATED { ms5, ms10, ms20, ms40, ms80, ms160,
spare2,spare1 }        OPTIONAL, -- Need S
    sfn0-Offset-r16                     SEQUENCE {
        sfn-Offset-r16                      INTEGER (0..1023),
        integerSubframeOffset-r16           INTEGER (0..9)
OPTIONAL -- Need R
    }
OPTIONAL, -- Need R
    sfn-SSB-Offset-r16                  INTEGER (0..15),
    ss-PBCH-BlockPower-r16              INTEGER (-60..50)
OPTIONAL -- Cond Pathloss
}
SSB-InfoNcell-r16 ::=               SEQUENCE {
    physicalCellId-r16                  PhysCellId,
    ssb-IndexNcell-r16                  SSB-Index
OPTIONAL, -- Need S
    ssb-Configuration-r16               SSB-Configuration-r16
OPTIONAL -- Need S
}
[...]
SRS-ResourceId ::=                  INTEGER (0..maxNrofSRS-Resources-1)
-- TAG-SRS-CONFIG-STOP
-- ASN1STOP
```

| SRS-Config field descriptions |
| --- |
| tpc-Accumulation |
| If the field is absent, UE applies TPC commands via accumulation. If disabled, UE applies the TPC command without accumulation (this applies to SRS when a separate closed loop is configured for SRS) (see TS 38.213 [13], clause 7.3). |

| SRS-Resource field descriptions |
| --- |
| [...] |
| nrofSRS-Ports |
| Number of ports. For CLI SRS-RSRP measurement, the network always configures this parameter to 'port1'. |
| [...] |
| resourceMapping |
| OFDM symbol location of the SRS resource within a slot including nrofSymbols (number of OFDM symbols), startPosition (value 0 refers to the last symbol, value 1 refers to the second last symbol, and so on) and repetitionFactor (see TS 38.214 [19], clause 6.2.1 and TS 38.211 [16], clause 6.4.1.4). The configured SRS resource does not exceed the slot boundary. If resourceMapping-r16 is signalled, UE shall ignore the resourceMapping (without suffix). For CLI SRS-RSRP measurement, the network always configures nrofSymbols and repetitionFactor to 'n1'. |
| resourceType |
| Periodicity and offset for semi-persistent and periodic SRS resource (see TS 38.214 [19], clause 6.2.1). For CLI SRS-RSRP measurement, only 'periodic' is applicable for resourceType. |
| [...] |
| servingCellId |
| The serving Cell ID of the source SSB, CSI-RS, or SRS for the spatial relation of the target SRS resource. If this field is absent the SSB, the CSI-RS, or the SRS is from the same serving cell where the SRS is configured. |
| spatialRelationInfo |
| Configuration of the spatial relation between a reference RS and the target SRS. Reference RS can be SSB/CSI-RS/SRS (see TS 38.214 [19], clause 6.2.1). This parameter is not applicable to CLI SRS-RSRP measurement. |
| [...] |

| SRS-ResourceSet field descriptions |
| --- |
| [...] |
| associatedCSI-RS |
| ID of CSI-RS resource associated with this SRS resource set in non-codebook based operation (see TS 38.214 [19], clause 6.1.1.2). |
| csi-RS |
| ID of CSI-RS resource associated with this SRS resource set. (see TS 38.214 [19], clause 6.1.1.2). |
| csi-RS-IndexServingcell |
| Indicates CSI-RS index belonging to a serving cell |
| p0 |
| P0 value for SRS power control. The value is in dBm. Only even values (step size 2) are allowed (see TS 38.213 [13], clause 7.3). |
| pathlossReferenceRS |
| A reference signal (e.g. a CSI-RS config or a SS block) to be used for SRS path loss estimation (see TS 38.213 [13], clause 7.3). |
| [...] |
| pathlossReferenceRSList |
| Multiple candidate pathloss reference RS(s) for SRS power control, where one candidate RS can be mapped to SRS Resource Set via MAC CE (clause 6.1.3.27 in TS 38.321 [3]). The |

| SRS-ResourceSet field descriptions |
|---|
| network can only configure this field if pathlossReferenceRS is not configured in the same SRS-ResourceSet. |
| resourceSelection |
| Indicates whether the configured SRS spatial relation resource is a SRS-Resource or SRS-PosResource. |
| resourceType |
| Time domain behavior of SRS resource configuration, see TS 38.214 [19], clause 6.2.1. The network configures SRS resources in the same resource set with the same time domain behavior on periodic, aperiodic and semi-persistent SRS. |
| slotOffset |
| An offset in number of slots between the triggering DCI and the actual transmission of this SRS-ResourceSet. If the field is absent the UE applies no offset (value 0). [...] |
| srs-ResourceIdList |
| The IDs of the SRS-Resources used in this SRS-ResourceSet. If this SRS-ResourceSet is configured with usage set to codebook, the srs-ResourceIdList contains at most 2 entries. If this SRS-ResourceSet is configured with usage set to nonCodebook, the srs-ResourceIdList contains at most 4 entries. |
| srs-ResourceSetId |
| The ID of this resource set. It is unique in the context of the BWP in which the parent SRS-Config is defined. |
| ssb-IndexSevingcell |
| Indicates SSB index belonging to a serving cell |
| ssb-NCell |
| This field indicates a SSB configuration from neighboring cell |
| usage |
| Indicates if the SRS resource set is used for beam management, codebook based or non-codebook based transmission or antenna switching. See TS 38.214 [19], clause 6.2.1. Reconfiguration between codebook based and non-codebook based transmission is not supported. |

The Final Report of 3GPP TSG RAN WG1 #102-e states:
Agreement
  To enable a PDCCH transmission with two TCI states, study pros and cons of the following alternatives:
    Alt 1: One CORESET with two active TCI states
    Alt 2: One SS set associated with two different CORESETs
    Alt 3: Two SS sets associated with corresponding CORESETs
    At least the following aspects can be considered: multiplexing schemes (TDM/FDM/SFN/combined schemes), BD/CCE limits, overbooking, CCE-REG mapping, PDCCH candidate CCEs (i.e. hashing function), CORESET/SS set configurations, and other procedural impacts.
Agreement
  For non-SFN based mTRP PDCCH reliability enhancements, study the following options:
    Option 1 (no repetition): One encoding/rate matching for a PDCCH with two TCI states
    Option 2 (repetition): Encoding/rate matching is based on one repetition, and the same coded bits are repeated for the other repetition. Each repetition has the same number of CCEs and coded bits, and corresponds to the same DCI payload.
      Study both intra-slot repetition and inter-slot repetition
    Option 3 (multi-chance): Separate DCIS that schedule the same PDSCH/PUSCH/RS/TB/etc. or result in the same outcome.
      Study both cases of DCIS in the same slot and DCIS in different slots

[ . . . ]
Agreement
  For mTRP PDCCH reliability enhancements, study the following multiplexing schemes
    TDM: Two sets of symbols of the transmitted PDCCH/two non-overlapping (in time) transmitted PDCCH repetitions/non-overlapping (in time) multi-chance transmitted PDCCH are associated with different TCI states
      Aspects and specification impacts related to intra-slot vs inter-slot to be discussed
    FDM: Two sets of REG bundles/CCEs of the transmitted PDCCH/two non-overlapping (in frequency) transmitted PDCCH repetitions/non-overlapping (in frequency) multi-chance transmitted PDCCH are associated with different TCI states
[ . . . ]
Agreement
  For Alt 1 (one CORESET with two active TCI states), study the following
    Alt 1-1: One PDCCH candidate (in a given SS set) is associated with both TCI states of the CORESET.
    Alt 1-2: Two sets of PDCCH candidates (in a given SS set) are associated with the two TCI states of the CORESET, respectively
    Alt 1-3: Two sets of PDCCH candidates are associated with two corresponding SS sets, where both SS sets are associated with the CORESET and each SS set is associated with only one TCI state of the CORESET
    Note 1: A set of PDCCH candidates contain a single or multiple PDCCH candidates, and a PDCCH candidate in a set corresponds to a repetition or chance Note 2: How one or more PDCCH candidates are counted for monitoring (for BD limit) is FFS
The note is applicable also to other alternatives
Agreement
For Alt 1-2/1-3/2/3, study the following
Case 1: Two (or more) PDCCH candidates are explicitly linked together (UE knows the linking before decoding)
FFS: How the explicit linkage is derived/determined by the UE
Case 2: Two (or more) PDCCH candidates are not explicitly linked together (UE does not know the linking before decoding)
FFS: How the UE knows the linkage after decoding
The Final Report of 3GPP TSG RAN WG1 #103-e states:
Agreement
For PDCCH reliability enhancements, support SFN scheme+Alt 1-1.
FFS: TCI state activation for CORESET, impact on default beam, BFD resource for BFR
Agreement
For PDCCH reliability enhancements with non-SFN schemes, support at least Option 2+Case 1.
Maximum number of linked PDCCH candidates is two
[ . . . ]
Working Assumption
For PDCCH reliability enhancements with non-SFN schemes and Option 2+Case 1, support Alt3 (two SS sets associated with corresponding CORESETs).
Agreement
For PDCCH reliability enhancements with non-SFN schemes and Option 2+Case 1, CCEs of the two PDCCH candidates are counted separately following Rel. 15/16 procedures. Further study the BD limit by considering the following
With respect to the complexity associated with RE de-mapping/demodulation, 2 units are required
With respect to the complexity associated with decoding, the following assumptions can be further discussed:
Assumption 1: UE only decodes the combined candidate without decoding individual PDCCH candidates
Assumption 2: UE decodes individual PDCCH candidates
Assumption 3: UE decodes the first PDCCH candidate and the combined candidate
Assumption 4: UE decodes each PDCCH candidate individually, and also decodes the combined candidate
Note 1: The Assumptions 1-4 are for discussion purpose only, and they may or may not have specification impact.
FFS: The relationship between UE capability, RRC configuration, and the BD limit, and whether the Assumptions 1-4 are relevant for this purpose.
Note 2: the BD/CCE limit here is counted based on the configuration of PDCCH monitoring capability (e.g. per slot or per span).
3GPP R1-2104655 states:
This feature is originally introduced in Rel. 16 eURLLC for the purpose of power boosting URLLC transmissions when they collide with eMBB traffic of another UE by modifying P0 to be able to control the open-loop power in case of collision. Specifically, DCI format 0-1 or 0-2 can be configured with a field "Open-loop power control parameter set indication", which is one bit (when SRI field is present), and when the value of the field is 1, a different P0 value for open loop power control is used (e.g. to power boost). The value of P0 is determined based on RRC-configured list of P0 values (i.e., "p0-PUSCH-SetList-r16") with a one-to-one mapping to SRI codepoints. In the case of multi-TRP PUSCH repetitions, it is possible that the eMBB traffic creates interference only at one of the TRPs. Hence, repetitions targeted toward the other TRP do not require power boosting. It is important to note that unnecessary power boosting will not only result in additional power consumption at the UE, but also degrades the system's performance due to introducing additional interference. This scenario is illustrated in FIG. 2.

Figure 25:
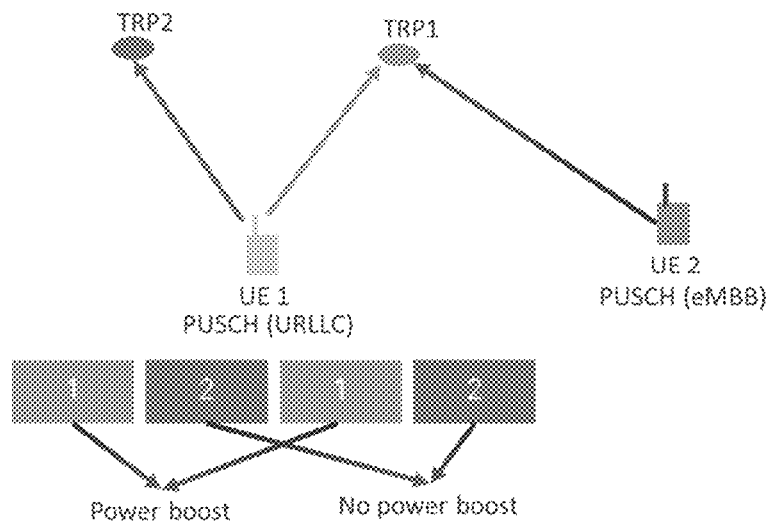
FIG. 25 is a reproduction of FIG. 2 of 3GPP R1-2104655.

FIG. 2 of 3GPP R1-2104655, Entitled "Power Boosting for URLLC Traffic in the Case of Multi-TRP PUSCH Repetitions", is Reproduced as FIG. 25

Based on the above explanations, if the power boosting of the two sets of repetitions are to be controlled separately (i.e. depending on the interference at each of the TRPs), two "Open-loop power control parameter set indication" fields are required that correspond to the two SRI fields, respectively, as illustrated in FIG. 3. This corresponds to one additional bit for the second field. The second two "Open-loop power control parameter set indication" should be associated with a second RRC-configured p0-PUSCH-SetList-r16 with the same interpretation as in Rel. 16.
The above is applicable to the case of SRI fields are present. When SRI fields are not present, even though the same enhancement can be considered, it depends on whether/how basic mTRP power control is enhanced, which is a separate discussion (see the discussions below related to SRI fields being absent in general, i.e., irrespective of Open-loop power control parameter set indication)

Figure 26:
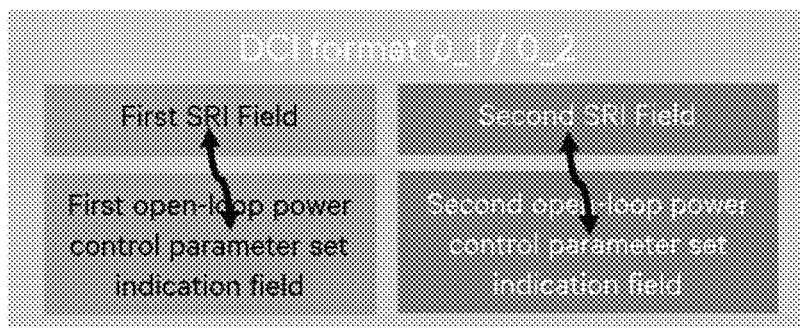
FIG. 26 is a reproduction of FIG. 3 of 3GPP R1-2104655.

FIG. 3 of 3GPP R1-2104655, Entitled "Two SRI Fields and Two Corresponding "Open-Loop Power Control Parameter Set Indication" Fields are Indicated in the DCI", is Reproduced as FIG. 26

Proposal 1: For multi-TRP PUSCH repetition, at least for a DCI that includes two SRI fields, two "Open-loop power control parameter set indication" fields when configured.
A second p0-PUSCH-SetList-r16 is configured, which is associated with the second set of repetitions and second SRI field
The first and second "Open-loop power control parameter set indication" fields are associated with the first and second SRI fields, respectively, and power-boosting are separately indicated for the two sets of repetitions based on the first and second p0-PUSCH-SetList-r16.
FFS: When SRI fields are absent.
The Draft Report of 3GPP TSG RAN WG1 #104-3 states:
Agreement
Support CG PUSCH transmission towards M-TRPs using a single CG configuration.
Use same beam mapping principals as dynamic grant PUSCH repetition scheme.
FFS: Required changes on CG parameters (Config-uredGrantConfig)
The feature is UE optional
Agreement
For single DCI based M-TRP PUSCH repetition schemes, in codebook based PUSCH,
Support two SRI fields corresponding to two SRS resource sets are included in DCI formats 0_1/0_2.

Each SRI field indicating SRI per TRP, where the SRI field based on Rel-15/16 framework Support dynamic switching between multi-TRP and single-TRP operation FFS: Support dynamic switching the order of two TRPs Agreement For single DCI based M-TRP PUSCH repetition schemes, in codebook based PUSCH, Two TPMI fields are indicated in DCI formats 0_1/0_2.
The first TPMI field uses the Rel-15/16 TPMI field design (which includes TPMI index and the number of layers) of DCI format 0_1/0_2. The second TPMI field only contains the second TPMI index. The same number of layers are applied as indicated in the first TPMI field.

FFS: Details of second TPMI field interpretation including changes expected in Tables 7.3.1.1.2-2/ 2A/2B/3/3A/4/4A/5/5A in 38.212

FFS: Interpreting TPMI fields when multi-TRP and single-TRP PUSCH repetition is applied.

FFS: whether to support of PUSCH repetitions transmitting towards two TRPs sharing the same TPMI indicated by a TPMI field.

FFS: The size of the second TPMI field can be equal to or smaller than the size of the first TPMI field Agreement For single DCI based M-TRP PUSCH repetition schemes, in non-codebook based PUSCH, Support two SRI field(s) corresponding to two SRS resource sets are included in DCI formats 0_1/0_2.
Each SRI field indicating SRI per TRP, where the first SRI field based on Rel-15/16 framework, Support the same number of layers applied over repetitions FFS: details of second SRI field including the specification change for Table 7.3.1.1.2-28/29/30/31 in 38.212.

Support dynamic switching between multi-TRP and single-TRP operation

FFS: whether/how to use SRI field(s) and additional details of SRI field(s) interpretations FFS: Minimizing the DCI overhead for PUSCH repetition Type A as a result of number of layers being limited to 1 when more than one repetition is scheduled.

FFS: Support dynamic switching the order of two TRPs

The Chairman's Notes RAN1 #104b-e final states:

Agreement

When SRS resources from two SRS resource sets indicated in DCI format 0_1/0_2, for linking SRI fields to two power control parameters, it is up to RAN2 to finalize the RRC details related to linking. RAN1 identified that the following options could be used.

Alt. 1: Add second sri-PUSCH-MappingToAddModList, and select two SRI-PUSCH-PowerControl from two sri-PUSCH-MappingToAddModList Alt. 2: Add SRS resource set ID in SRI-PUSCH-Power-Control, and select SRI-PUSCH-PowerControl from sri-PUSCH-MappingToAddModList considering the SRS resource set ID Agreement For PHR reporting related to M-TRP PUSCH repetition, select one from the following options in RAN1 #105-e meeting.

Option 1: Calculate one PHR associated with the first PUSCH occasion (earliest repetition that overlaps with the first slot in which the PUSCH that carries the PHR MAC-CE is transmitted)

Option 2: Calculate two PHRs, each associated with a first PUSCH occasion to each TRP, but report one of them FFS: How to select the PHR for reporting.

Option 4: Calculate two PHRs, each associated with a first PUSCH occasion to each TRP, and report two PHRs Option 5: No changes to legacy PHR reporting Agreement When MAC-CE indicates a PL-RS ID for one or more SRI IDs, it also indicates whether the SRI IDs are associated with the first or the second SRS resource set.

Working Assumption

For indicating STRP/MTRP dynamic switching for non-CB/CB based MTRP PUSCH repetition, Introduce a new field in DCI to indicate at least the S-TRP or M-TRP operation FFS: Whether the new field is 1 bit or 2 bits Working Assumption For non-codebook based multi-TRP PUSCH, the first SRI field is used to determine the entry of the second SRI field which only contains the SRI(s) combinations corresponding to the indicated rank (number of layers) of the first SRI field. The number of bits, $N_2$, for the second SRI field is determined by the maximum number of codepoint(s) per rank among all ranks associated with the first SRI field. For each rank x, the first $K_x$ codepoint(s) are mapped to $K_x$ SRIs of rank x associated with the first SRS field, the remaining $(2^{N_2}-K_x)$ codepoint(s) are reserved.

Agreement

For the indication of open-loop power control parameter (OLPC) in DCI format 0_1/0_2, support enhanced open-loop power control parameter (OLPC) set indication by indicating per-TRP OLPC set.

[ . . . ]

Agreement

For CB based M-TRP PUSCH repetition, the first TPMI field is used to determine the entry of the second TPMI field which only contains TPMIs corresponding to the indicated rank (number of layers) of the first TPMI field. The second TPMI field's bit width, $M_2$, is determined by the maximum number of TPMIs per rank among all ranks associated with the first TPMI field. For each rank y, the first $K_y$ codepoint(s) of the second TPMI field are mapped to $K_y$ TPMI(s) of rank y associated with the first TPMI field in increasing order codepoint index, the remaining $(2^{M_2}-K_y)$ codepoint(s) are reserved.

[ . . . ]

Agreement

For type 1 or type 2 CG based multi-TRP PUSCH repetition,

Introduce the second fields of 'p0-PUSCH-Alpha' and 'powerControlLoopToUse' in 'ConfiguredGrantConfig'

For type 1 CG based m-TRP PUSCH repetition, introduce the second fields of 'pathlossReferenceIndex', 'srs-ResourceIndicator' and 'precodingAndNumberOfLayers' in 'rrc-ConfiguredUplinkGrant'.

For type 2 CG based M-TRP PUSCH, two SRIs/TPMIs are indicated via the activating DCI.

[ . . . ]

3GPP R1-2103550 states:

Indication of Two SRIs for Non-Codebook Based PUSCH

In RAN1 #104e, it was agreed that two SRI fields in DCI format 0_1 and DCI format 0_2 will be supported for PUSCH repetition to multiple TRPs, where the first SRI field is the same as in Rel-15/16. The second SRI field will be designed with the assumption that the same number of layers applied for repetitions to both TRPs.

Assuming N1 bits are allocated for the first SRI field and N2 bits for the second SRI field as shown in FIG. 3, the first SRI field has a same number of bits and same codepoint to SRI mapping as in Rel-15/16 DCI Format 0_1 or DCI Format 0_2.

FIG. 3 of 3GPP R1-2103550, Entitled "an Example of Using Separate Bit Fields for the First and the Second SRIs", is Reproduced as FIG. 27

Note that multiple of SRIs may be associated with a single codepoint for non-codebook based SRS resource set, where each SRI indicates a SRS resource or a SRS port. Thus, the number of SRIs indicated by a codepoint is also equivalent to the number of antenna ports.

For the second SRI field, codepoint to SRI(s) mappings depend on the number of SRIs (SRS ports) indicated by the first SRI field. If the first SRI field indicates x ports, the codepoints of the second SRI field would be mapped only to the SRI(s) associated with x ports.

One design option for the second SRI field is as follows. Let $K_x$ be the number of codepoints in the first SRI field associated with the x number of SRS ports (or SRIs) and the corresponding codepoints are $\{c_0(x), c_1(x), c_{K_x-1}(x)\}$, where $0 \le c_0(x) < c_1(x) < \ldots < c_{K_x-1}(x) \le 2^{N1}-1$, then codepoint $j \in [0, 1, \ldots, K_x-1]$ of the second SRI field is mapped to SRI(s) associated with codepoint $c_j(x)$ of the first SRI field. The remaining codepoints are reserved. This is illustrated in FIG. 4. With this approach, the number of bits needed for the $2^{nd}$ SRI field can be reduced.

FIG. 4 of 3GPP R1-2103550, Entitled "an Example of Mapping Codepoints of the Second SRI Field to x Number of SRS Ports", is Reproduced as FIG. 28

An example is shown in FIG. 5, where Table 7.3.1.1.2-31 of 38.212 with $L_{max}=4$, and $N_{SRS}=4$ is assumed and N1=4. If the first SRI field indicates x=2 SRS ports with any one of the code points 4 to 9, only codepoint to SRI(s) mappings for 2 ports are used in the second SRI field. Considering that x can be 1,2,3,4 in this case, N2=3 bits are needed for the second SRI field.

FIG. 5 of 3GPP R1-2103550, Entitled "an Example of Mapping Codepoints of the Second SRI Field to SRIs Based on the Indicated Number of Ports by the First SRI Field", is Reproduced as FIG. 29

For non-codebook based multi-TRP PUSCH, codepoint to SRI(s) mapping for the second SRI field depends on the rank (e.g., the number of SRS ports or SRIs) indicated by the first SRI field. The number of bits, $N_2$, for the second SRI field is determined by the maximum number of codepoints per rank among all ranks associated with the first SRI field. For each rank x, the first $K_x$ codepoints are mapped to $K_x$ SRIs of rank x associated with the first SRS field, the remaining $(2^{N_2}-K_x)$ codepoints are reserved.

Indication of Two TPMIs for Codebook based PUSCH

It was agreed in the last meeting that two TPMI fields in DCI formats 0_1 and 0_2 will be supported for PUSCH repetitions to multiple TRPs. The first TPMI field uses the Rel-15/16 TPMI field design (which includes TPMI index and the number of layers) of DCI format 0_1/0_2. The second TPMI field only contains the second TPMI index. The same number of layers are applied as indicated in the first TPMI field.

FIG. 6 of 3GPP R1-2103550, Entitled "an Example of the First and the Second TPMI Fields", is Reproduced as FIG. 30

Similar to SRI, one design option for the second TPMI field is as follows. Let $K_y$ be the number of codepoints in the first TPMI field associated with y layers and the corresponding codepoints are $\{c_0(y), c_1(y), \ldots, c_{K_y-1}(y)\}$, where $0 \le c_0(y) < c_1(y) < \ldots < c_{K_y-1}(y) \le 2^{M1}-1$, then codepoint $j \in [0, 1, \ldots, K_y-1]$ of the second TPMI field is mapped to a TPMI associated with codepoint $c_j(y)$ of the first TPMI field. The remaining codepoints are reserved.

Using Table 7.3.1.1.2-2 of 38.212 as an example, where $M_{1=6}$ (i.e., 64 code points), the maximum number of codepoints among 1,2,3, and 4 layers that can be indicated by the first TPMI is 28. In this example, we need $M_{2=5}$. The TPMI mapping for the second TPMI field is shown in FIG. 7.

[FIG. 7 of 3GPP R1-2103550, Entitled "an Example of Mapping Codepoints of the Second TPMI Field to TPMIs Based on the Indicated Number of Layers by the First TPMI Field, where the First TPMI Field Corresponds to Table 7.3.1.1.2-2 and with codebookSubset=fullyAndPartialAndNonCoherent", is Reproduced as FIG. 31]

For codebook based multi-TRP PUSCH, the second TPMI field's bit width, $M_2$, is determined by the maximum number of TMPIs per rank among all ranks associated with the first TMPI field. For each rank y, the first $K_y$ codepoints of the second TMPI field are mapped to $K_y$ TPMIs of rank y associated with the first TPMI field in increasing order codepoint index, the remaining $(2^{M_2}-K_y)$ codepoints are reserved.

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

In NR Rel-15, beamforming technology are adopted to conquer the high power penetration in high frequency band, e.g. above 6 GHz. Hence, gNB and UE may both use some transmission beams and/or receiving beams to make high throughput data in such high frequency band reliable. How to choose suitable transmission beam and/or receiving beam has played an important role in NR Rel-15. Beam indication for various channels and reference signals are also well discussed and captured in specification along with the development of NR.

Nonetheless, in NR Rel-15, beam indication for receiving downlink (DL) transmission only considers transmission from a single TRP and/or using panel within a time duration (e.g. one slot or mini-slot), at least from perspective of UE. In NR Rel-16, people and companies resume to consider DL transmission from multiple TRPs and/or panels. For transmission from multiple TRP and/or panel, it may imply that a single DL transmission may be performed by different beam from multiple TRP and/or panel. It may also mean that UE may receive multiple DL transmission from multiple TRP and/or panel within a time duration (e.g. one slot or mini-slot). In NR Rel-16, enhancement to Ultra-Reliable Low-Latency Communication (URLLC) with consideration of multiple TRP scenario has been also made. Hence, there are some Physical Downlink Shared Channel (PDSCH) repetition schemes to improve reliability of receiving PDSCH. Some examples could be Spatial Domain Multiplexing (SDM) repetition scheme, FMD repetition scheme, mini-slot based repetition scheme and slot based repetition scheme.

Regarding NR Rel-17, people start to consider reliability enhancement of other channels, for example, Physical Downlink Control Channel (PDCCH), Physical Uplink Control Channel (PUCCH), and Physical Uplink Shared Channel (PUSCH). For achieving reliability of PUSCH, one or more PUSCH repetitions (delivering same TB to different TRP) on time domain could be one approach.

According to the current standard, Sounding Reference Signal (SRS) resource indicator field provides a code-point associated to a SRI-PUSCH-PowerControlId. In one embodiment, a UE, based on the SRI-PUSCH-PowerControlId, could derive or determine a SRI-PUSCH-PowerControl (associated to the SRI-PUSCH-PowerControlId). As introduction of mTRP PUSCH, one DCI could schedule one or more PUSCH transmission, and each of the one or more PUSCHs are transmitted with/via one of two uplink spatial filter/UE beam. In one embodiment, the one or more PUSCHs are transmitted to two TRPs. Since PUSCH with/via different uplink spatial filter/UE beam may have different channel condition (e.g., power attenuation, fading, coverage), power control may need to apply separately.

As agreed in RAN1, two SRS resource sets are in a DCI for scheduling mTRP PUSCHs. There are two designs in Rel-17 for mTRP PUSCH. The first design is to introduce one or two bits for indicating dynamic switch between sTRP and mTRP. In one embodiment, two bits may be used for indicating order of TRP. For example, one code-point of the one or two bits indicates sTRP (e.g., TRP1), sTRP (e.g., TRP2), mTRP (e.g., TRP1 followed by TRP2), and/or mTRP (TRP2 followed by TRP1). The second design is to introduce two SRS resource sets (or two SRS resource indicator field) indicated by the SCI and rank or layer of the two SRS resource set are the same. In one embodiment, in order to save DCI overhead, the second SRS resource set only comprises code-points of same rank or layer being the same as the first SRS resource set.

For example, in FIG. 32 (which is referenced from 3GPP R1-2103550), 4 bits for the first SRS resource indicator field and it depends on maximum code-points for each rank or layer to determine size for $2^{nd}$ SRS resource indicator field. In this example, 3 bits are used for SRS resource indicator field. However, there may be some issues.

The first issue is how to design association between code-point from first/second SRS resource indicator field to corresponding SRI-PUSCH-PowerControl. For example, in FIG. 32, code-points of $2^{nd}$ SRI field is only at most associated to ID 0~5 and reserved bit may not be used for indicating. In other words, only the lowest one or more IDs of SRI-PUSCH-PowerControl could be indicated. It may not be an efficient way for power control (regarding different number of port or layer or rank). The second issue may be size of sri-PUSCH-MappingToAddModList. In one embodiment, the UE may be configured with one or two sri-PUSCH-MappingToAddModList. In one embodiment, since used ID associated to the second SRI field may be less than when sTRP is indicated and only one SRI field is present (e.g., the second SRI field, and no the first SRI field), how network configures the one or more sri-PUSCH-MappingToAddModList may needs design.

In one embodiment, a scheduling cell could refer to a SCell, or a PCell. A scheduled cell could also refer to a PCell, or a SCell. A DSS scenario for SCell scheduling PCell could be one addressed scenario. For a scheduled cell being cross-cell/carrier scheduled by a scheduling cell, the UE may not receive PDCCH on the scheduled cell.

Concept 1:

In general, this concept is to determine a mapping between a SRI field in a DCI and an ID associated to power control configuration (SRI-PUSCH-PowerControl) based on at least the SRI field and an offset. Alternatively and/or additionally, for a SRI field, a UE could determine an ID associated to power control configuration (SRI-PUSCH-PowerControl) based on at least the SRI field and an offset.

In one embodiment, the SRI field may be a second SRI field in the DCI. The mapping between the SRI field in the DCI and an ID associated to power control configuration may be based on a first SRI filed in the DCI (e.g., the first SRI field indicates (information) of rank or layer or number of ports for the second SRI field). The ID associated to power control configuration could be (derived) based on (decimal) value of the SRI field plus the offset with preferably modulation a number. The ID associated to power control configuration could be the (decimal) value of the SRI field plus the offset. The ID associated to power control configuration could be the same value as the sum of the (decimal) value of the SRI field and the offset.

In one embodiment, mapping between a first SRI field in the DCI and the ID associated to power control could be based on (only) the first SRI field. Mapping between a first SRI field in the DCI and the ID associated to power control may not be based on the offset. Mapping between a first SRI field in the DCI and the ID associated to power control could be based on offset 0. For the first SRI field, a UE could determine an ID associated to power control configuration (SRI-PUSCH-PowerControl) based on at least the first SRI field. For the first SRI field, a UE could determine an ID associated to power control configuration (SRI-PUSCH-PowerControl) based on at least the first SRI field and offset which is with value 0.

In one embodiment, the offset may be a function of rank or layer or number of ports. The offset may be the same (decimal) value as the sum of number of code-points associated to one or more rank(s) or layer(s) or number of ports which is/are smaller than the rank or layer or number of ports associated to/indicated by the first SRI field in the DCI.

In one embodiment, the ID of power control configuration may be determined or derived based on at least SRI field and an offset, if the SRI field is the second SRI field in a DCI, and the first SRI field in the DCI indicates number of ports larger than 1. In one embodiment, for the second SRI field with a given number of ports x indicated by the first SRI field, the ID of power control configuration may be equal to the same result of sum of (decimal value) of the second SRI field and sum of f(i), i=0, 1, ... x−1, and f(i) is associated to code-points for a port number i. Code-points for a port number i may be one or more combination for the port number i. In one embodiment, f(0)=0.

In one embodiment, for the second SRI field with a given number of ports x indicated by the first SRI field and x is larger than 1, the ID of power control configuration may be equal to the same result of sum of (decimal value) of the second SRI field and sum of f(i), i=1, . . . x−1, and f(i) is associated to code-points for a port number i. In one embodiment, f(0)=0. Code-points for a port number i may be one or more combination for the port number i.

For example, in FIG. 32, f(1)=4, f(2)=6, f(3)=4, and f(4)=1. In this example, assuming the first SRI field indicates "1000" which is associated to 2 ports and the $2^{nd}$ SRI field indicates "010" which is associated to decimal value 2, the UE could derive or determine ID of power control configuration as 2+4=6.

In one embodiment, the ID of power control configuration may be determined or derived based on SRI field, if the SRI field is the first SRI field in a DCI, or the SRI field is the second SRI field in a DCI and the first SRI field in the DCI indicates number of ports being 1. In other words, the UE may not determine or derive ID of power control configuration based on the offset.

In one embodiment, the ID of power control configuration may be determined or derived based on at least SRI field and an offset with value 0 or being 0, if the SRI field is the $1^{st}$ SRI field in a DCI, or the SRI field is the $2^{nd}$ SRI field in a DCI and the $1^{st}$ SRI field in the DCI indicates number of ports being 1. In other words, the UE may determine or derive ID of power control configuration based on at least the SRI field and offset being 0.

For example, assuming the first SRI field indicates "1000" which is associated to 2 ports and the $2^{nd}$ SRI field indicates "010" which is associated to decimal value 2. In this example, the UE could derive or determine an offset based on number of code-points associated to 1 port. The offset could be derived or determined as 4. The UE could determine or derive an ID of power control configuration (SRI-PUSCH-PowerControl) based on (decimal) value of the second SRI field and the offset. The ID of power control configuration could be derived or determined as 6.

For example, in FIGS. 33A to 33C, SRI-PUSCH-PowerControlId is determined or derived based on different way. FIG. 33A illustrates an example of ($1^{st}$ SRI field, SRI indication for non-codebook based PUSCH transmission, $L_{max}$=4). FIG. 33B illustrates an example of ($2^{nd}$ SRI field, SRI indication for non-codebook based PUSCH transmission, $L_{max}$=4). FIG. 33C illustrates an example of ($2^{nd}$ SRI field, SRI indication for non-codebook based PUSCH transmission, $L_{max}$=4).

For the $1^{st}$ SRI field in FIG. 33A, SRI-PUSCH-PowerControlId is the same (decimal) value as the $1^{st}$ SRI field. However, for the $2^{nd}$ SRI field in FIGS. 33B and 33C, SRI-PUSCH-PowerControlId may not (directly) be derived or determined based on the same (decimal) value as the $2^{nd}$ SRI field. Though for 1 port $2^{nd}$ SRI field, SRI-PUSCH-PowerControlId may (directly) be derived or determined based on the same (decimal) value as the $2^{nd}$ SRI field, for number of port larger than 1 port, SRI-PUSCH-PowerControlId may not (directly) be derived or determined based on the same (decimal) value as the $2^{nd}$ SRI field. For 2 ports $2^{nd}$ SRI field, 000~101 associated to decimal value 0~5 may correspond SRI-PUSCH-PowerControlId 4~9. For 3 ports $2^{nd}$ SRI field, 000~011 associated to decimal value 0~3 may correspond SRI-PUSCH-PowerControlId 10~13. For 4 ports $2^{nd}$ SRI field, 000 associated to decimal value 0 may correspond SRI-PUSCH-PowerControlId 14.

In one embodiment, the UE could determine the transmit power for one or more PUSCHs scheduled by the DCI based on at least the first SRI field and/or the second SRI field. Based on the ID associated to power control configuration, the UE could determine or derive that one or more information associated to a power control configuration associated to the ID. The one or more information may comprise PL RS ID, target received power (e.g., P0), pathloss compensation value (e.g., alpha), and/or closed loop index (e.g., 0 or 1).

In one embodiment, the UE could determine the transmit power for PUSCH(s) of the one or more PUSCH which the PUSCH(s) is associated with a first spatial filter based on at least one or more information associated to the first SRI field. In one embodiment, the UE could determine the transmit power for PUSCH(s) of the one or more PUSCH which the PUSCH(s) is associated with a second spatial filter based on at least one or more information associated to the second SRI field.

In one embodiment, the first spatial filter may be associated with the first SRI field. The second spatial filter may be associated with the second SRI field. The first SRI field may be associated with the first SRS resource set or the second SRS resource set. The first spatial filter could be determined based on spatial relation associated to the SRS resource set associated to the first SRI field.

In one embodiment, the first spatial filter may be associated with a first source reference signal. The first spatial filter may be associated with a first beam. The first spatial filter may be associated with a first reference signal which is associated with the first SRI field. The first spatial filter may be associated with a first reference signal which is associated to the SRS resource set associated to the first SRI field.

In one embodiment, the second SRI field may be associated with the first SRS resource set or the second SRS resource set. The second spatial filter could be determined based on spatial relation associated to the SRS resource set associated to the second SRI field.

In one embodiment, the second spatial filter may be associated with a second source reference signal. The second spatial filter may be associated with a second reference signal which is associated to the second SRI field. The second spatial filter may be associated with a second reference signal which is associated to the SRS resource set associated to the second SRI field. The second spatial filter may be associated with a second beam.

In one embodiment, a number of PUSCH transmissions could be indicated in DCI. For example, a TDRA field could be an entry indicating a time domain resource allocation and a repetition number. A number of PUSCH transmissions could be configured by RRC signaling. A number of PUSCH transmissions could be indicated by MAC CE. Based on the DCI, the UE could transmit one or more PUSCHs. The one or more PUSCHs could be for a same TB.

In one embodiment, type-A PUSCH repetition may mean that each of the one or more PUSCHs is in a different (consecutive) slot. The one or more PUSCHs could have a same starting OFDM symbol in a slot. The one or more PUSCHs could have the same duration/length.

In one embodiment, the rv sequence for the one or more PUSCH could be based on an order per spatial filter/SRI field/TRP/beam. For example, for PUSCHs associated with a same spatial filter is based on (0, 2, 3, 1). The one or more PUSCH could be associated with the first SRI field/first TRP/first spatial filter/first beam and the second SRI field/second TRP/second spatial filter/second beam in the DCI.

In one embodiment, for sequential mapping, association of the one or more PUSCH in time domain and the first SRI field and second SRI field could be "first, first, second, second, . . . ". For cyclic mapping, association of the one or more PUSCH in time domain and the first SRI field and second SRI field could be "first, second, first, second, . . . ". For sequential mapping, association of the one or more PUSCH in time domain and the first SRI field and second SRI field could be "first, first, . . . , first, second, second, . . . , second".

Figure 41:
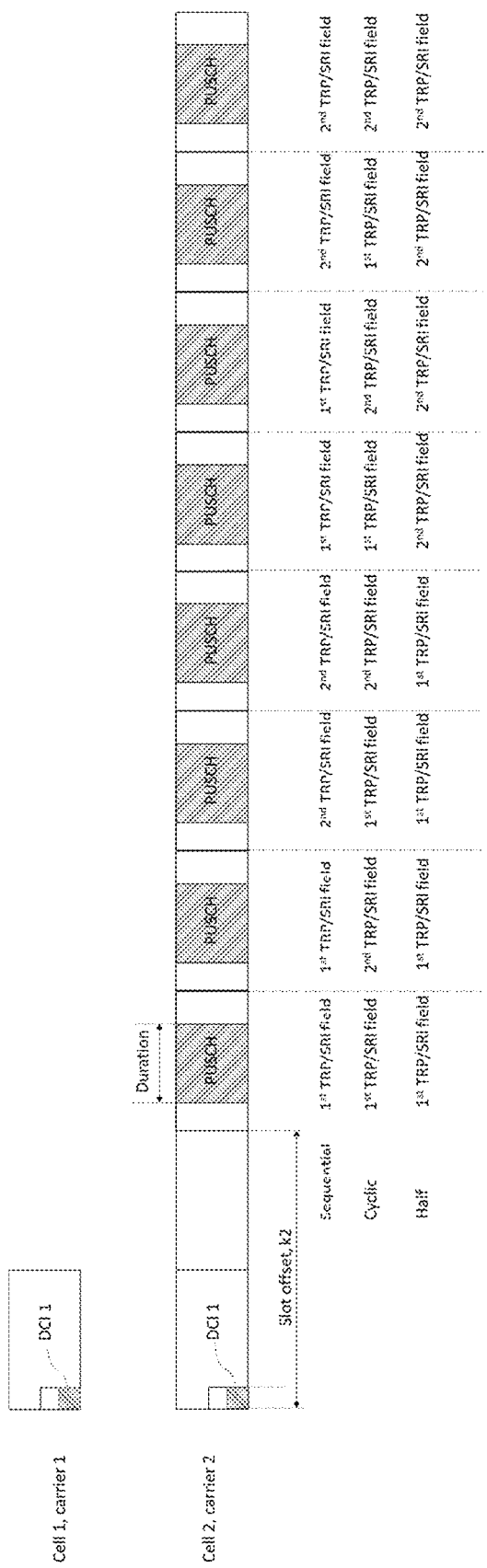
FIG. 41 is a diagram according to one exemplary embodiment.

For example, in FIG. 41, a UE may receive a DCI 1 from cell 1/carrier1 or cell 2/carrier2, and the DCI 1 could schedule eight PUSCHs for a same TB. Cross-cell/carrier scheduling may be that DCI 1 and PUSCHs are in different cells. Self-cell/carrier scheduling may be DCI 1 and PUSCHs are in the same cell. Association between eight PUSCHs and the first SRI field and the second SRI field could be illustrated based on different mapping.

In one embodiment, a UE could be configured with a first SRS resource set for non-codebook. The UE could be configured with a second SRS resource set for non-codebook. One restriction on network may be same SRS resource number in the first SRS resource set and in the second SRS resource set. The UE may not expect that the number of SRS resources in the first SRS resource set and in the second SRS resource set are different. Alternatively, network could configure the UE with different number SRS resources in the first SRS resource set and in the second SRS resource set.

In one embodiment, the UE could be configured with a first set of power control configuration. The UE could be configured with a second set of power control configuration. The first set of power control configuration could be associated with a first TRP. The second set of power control configuration could be associated with a second TRP. The first set of power control configuration could be associated with the first SRS resource set. The second set of power control configuration could be associated with the second SRS resource set. The first set of power control configuration could be associated with a first TRP and a second TRP. The first set of power control configuration could be associated with the first SRS resource set and the second SRS resource set.

In one embodiment, the first set of power control configuration may comprise one or more first power control configurations (e.g., SRI-PUSCH-PowerControl). The second set of power control configuration may comprise one or more second power control configurations (e.g., SRI-PUSCH-PowerControl). One of the one or more first power control configurations may comprise an ID associated with the first power control configuration (e.g., SRI-PUSCH-PowerControlId), PL RS ID (e.g., PUSCH-PathlossReferenceRS-Id), ID associated P0 and/or alpha (P0-PUSCH-AlphaSetId), and/or closed loop index (e.g., 0 or 1). One of the one or more second power control configurations may comprise an ID associated with the second power control configuration (e.g., SRI-PUSCH-PowerControlId), PL RS ID (e.g., PUSCH-PathlossReferenceRS-Id), ID associated P0 and/or alpha (P0-PUSCH-AlphaSetId), and/or closed loop index (e.g., 0 or 1). One of the one or more first power control configurations may comprise TRP specific ID/SRS resource set ID/SRI field ID.

In one embodiment, TRP specific ID/SRS resource set ID/SRI field ID could be used for identifying that whether the one of the one or more first power control configurations is associated with the 1st TRP or 2nd TRP, associated with the first SRS resource set or the second SRS resource set, or associated with first SRI field or second SRI field (if present) in a DCI. For a given, TRP specific ID/SRS resource set ID/SRI field ID, an ID associated with the first power control configuration ID, could be the same or reused for another TRP specific ID/SRS resource set ID/SRI field ID.

Figure 38:
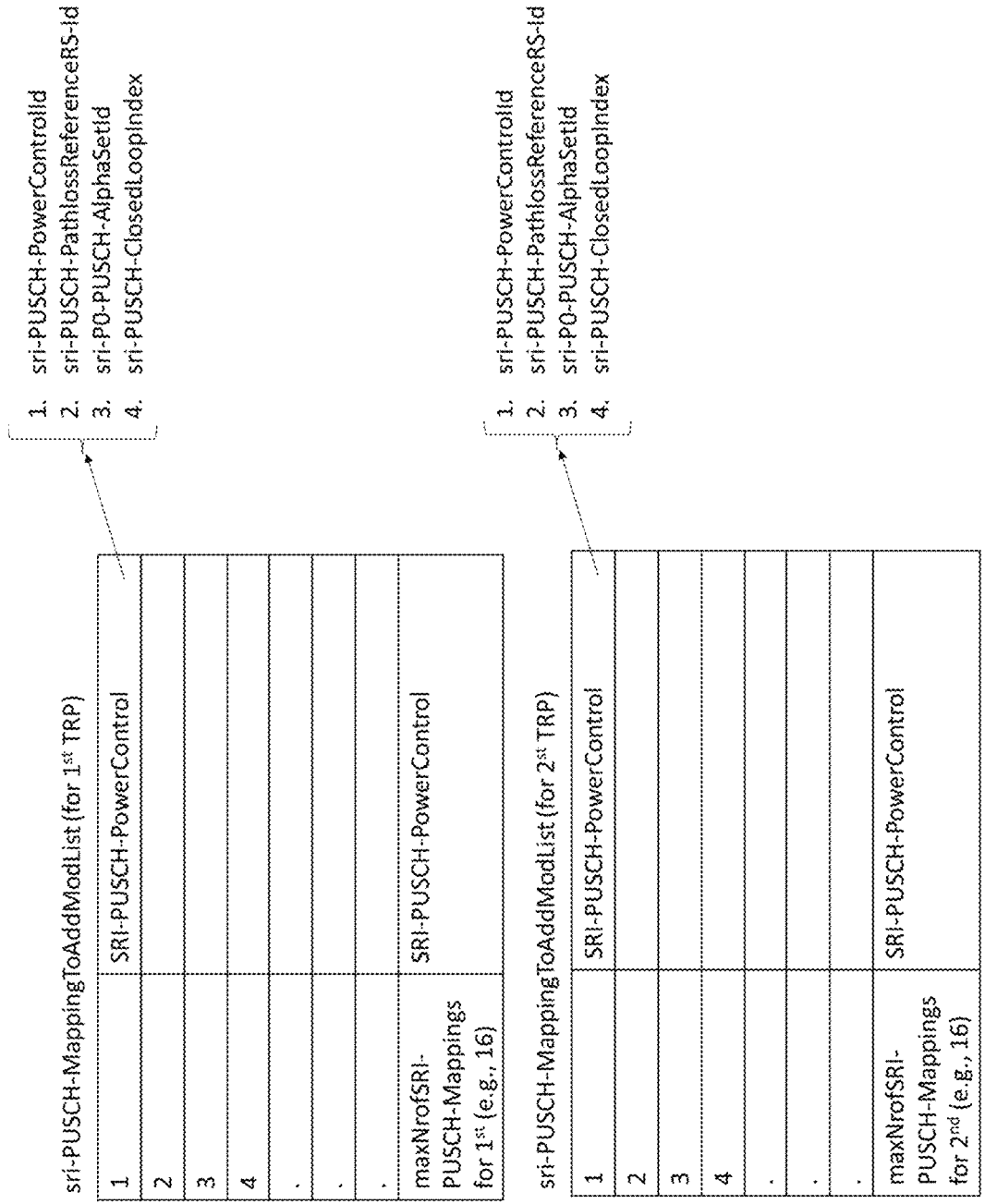
FIG. 38 is a diagram according to one exemplary embodiment.

For example, in FIG. 38, a UE could be configured with two set of power control configuration. The first set of power control configuration could be associated with the $1^{st}$ TRP, the first SRS resource set, or the first SRI field. The second set of power control configuration could be associated with the $2^{nd}$ TRP or second SRS resource set or the second SRI field. Entry in the first/second set of power control configuration may indicate information of PL RS, P0, alpha, closed loop index.

For example, in FIG. 39, a UE could be configured with one set of power control configuration associated with two TRPs, two SRS resource sets, or two SRI fields. Entry in the set of power control configuration may have parameter indicative of TRP/SRS resource set/SRI field the entry associated with. Entry in the set of power control configuration may indicate information of PL RS, P0, alpha, closed loop index.

For example, in FIG. 40, a UE could be configured with one set of power control configuration associated to two TRPs, two SRS resource sets, or two SRI fields. The UE could be configured with a number of entry associated to one TRP/SRS resource set/SRI field. In this example, the UE could be configured with 16 entries associated with the first TRP/first SRS resource set/first SRI field. The UE could derive or determine that half of the entries (with ceil or floor operation) in the set of power control configuration are associated with one TRP/SRS resource set/SRI field.

In one embodiment, (for one first set of power control configuration associated to the first SRS resource set and the second SRS resource set), the UE could be configured with a TRP specific ID/SRS resource set ID/SRI field ID in each first power control configuration (e.g., SRI-PUSCH-PowerControl). In one embodiment, (for one first set of power control configuration associated to the first SRS resource set and the second SRS resource set), the UE could be configured with one starting number of entry in the first set of power control configuration. For example, entry with entry index 1~the starting number-1 in the first set of power control configuration could be associated with the first SRS resource set/first TRP/first SRI field. Entry with entry the starting number~maxNrofSRI-PUSCH-Mappings for first TRP and second TRP in the first set of power control configuration could be associated with the first SRS resource set/first TRP/first SRI field.

In one embodiment, the DCI may comprise a specific field. The specific field may comprise one or two bits. The specific field may at least indicate single TRP (sTRP) or multiple TRP (mTRP).

In one embodiment, (when the specific field indicates sTRP), the specific field may indicate which SRS resource set is used. The indicated SRS resource set may be associated with the first SRI filed in the DCI. For example, 0 or 00 may indicate the first SRS resource set, and 1 or 01 may indicate the second SRS resource set, or vice versa.

In one embodiment, (when the specific field indicates mTRP), the specific field may indicate an order of the first SRS resource set and the second SRS resource set. For example, 10 may indicate the first SRS resource set followed by the second SRS resource set, and 11 may indicate the second SRS resource set followed by the first SRS resource set. As another example, 10 may indicate that the first SRS resource set is associated with the first SRI field and the second SRS resource set is associated with the second SRI field, and 11 may indicate that the second SRS resource set is associated with the first SRI field and the first SSRS resource set is associated with the second SRI field. In one embodiment, (when the specific field indicates mTRP), the specific field may indicate which SRS resource set is used first. The SRS resource set, which is indicated as used first, may be associated with the first SRI filed in the DCI.

In one embodiment, the specific field may provide information related that the first SRI field is associated with the first SRS resource set. The specific field may provide information related that the first SRI field is associated with the second SRS resource set. The specific field may provide information related that the first SRI field is associated with the first set of power control configuration. The specific field may provide information related that the first SRI field is associated with the second set of power control configuration. The specific field may provide information related that the second SRI field is associated with the first SRS resource set. The specific field may provide information related that the second SRI field is associated with the second SRS resource set. The specific field may provide information related that the second SRI field is associated with the first set of power control configuration. The specific field may provide information related that the second SRI field is associated with the second set of power control configuration.

Concept 2:

In general, this concept is to determine a mapping between a second SRI field in a DCI and an ID associated to power control configuration based on the second SRI field in the DCI and a first SRI field in the DCI. In one embodiment, the first SRI field may provide a number of ports or layers or rank. Decimal value of the second SRI field, x (e.g., x=1 according to the second SRI field "001") may be associated with (x+1)-th lowest ID for a given number of ports or layers or rank from the first SRI field. Decimal value of the first SRI field, x (e.g., x=1 according to the first SRI field "001") may be associated with (x+1)-th ID.

Figure 34:
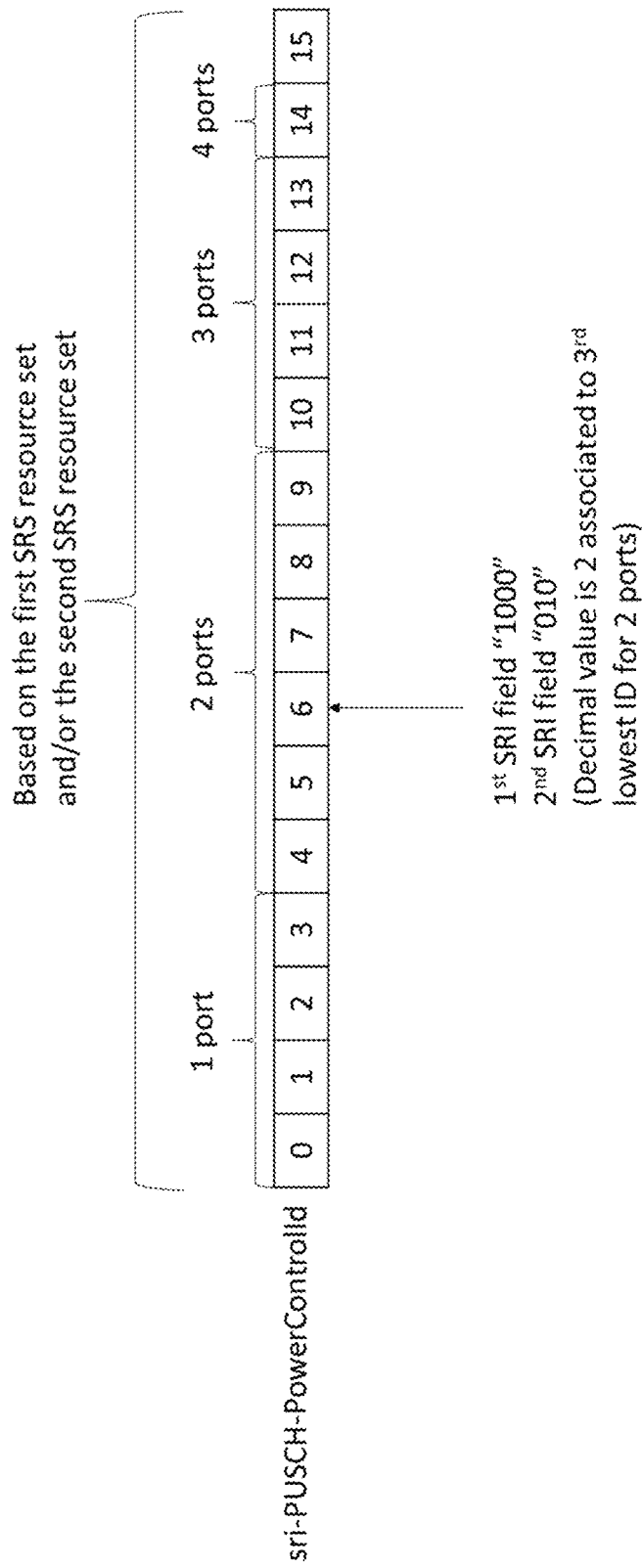
FIG. 34 is a diagram according to one exemplary embodiment.
Figure 35:
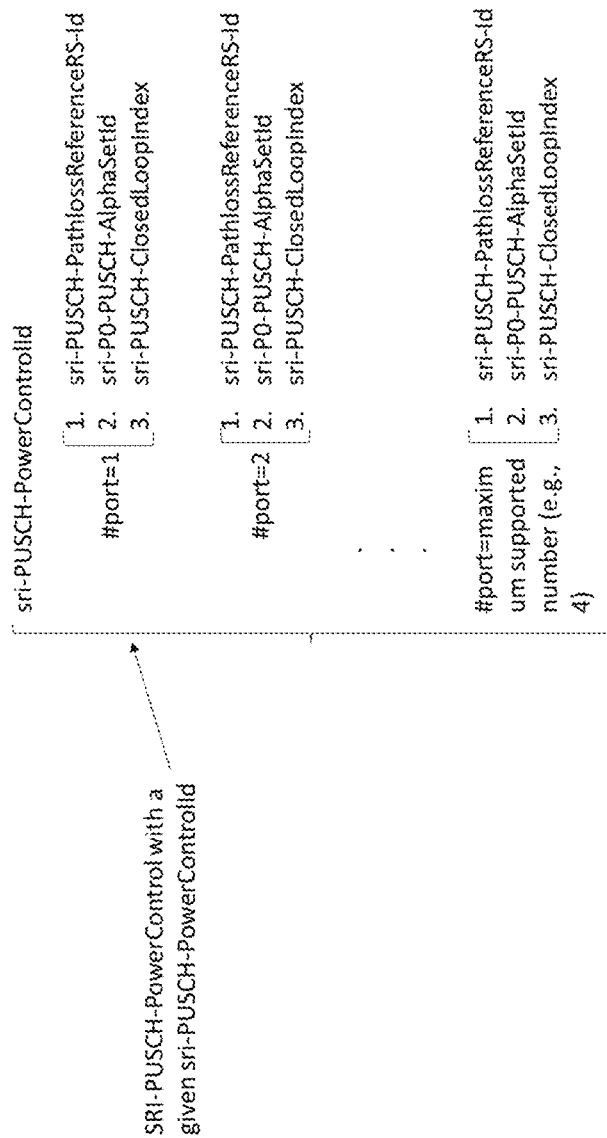
FIG. 35 is a diagram according to one exemplary embodiment.

For example, in FIG. 32 and FIG. 35, assuming that the 1$^{st}$ SRI field indicates "1000" which is associated with 2 ports and the 2$^{nd}$ SRI field indicates "010" which is associated with decimal value 2, the UE could determine (2+1)-th lowest ID for 2 ports. In this example, as shown in FIG. 34, the 3-rd lowest ID for 2 ports is 6. Based on the received DCI, the UE could derive transmit power based on one or more information associated to SRI-PUSCH-PowerControl with ID=6.

Concept 3:

In general, this concept is to configure or provide a UE with one power control configuration (e.g., SRI-PUSCH-PowerControl) with a given ID and the one power control configuration may comprise one or more information for one or more number of ports or layers or rank (respectively). This concept could be applied for a second SRI field in a DCI. This concept may be used when no dynamic switch order or a fixed relation between a first/second SRI field and the first/second SRS resource set.

For example, in FIG. 35, one power control configuration with a given ID may comprise one or more information associated with each #port(number of port). In this example, a UE could receive a DCI with first SRI field indicating 2 ports and second SRI field "001". The UE could determine or derive an ID of power control configuration based on the second SRI field "001", and could determine or derive one or more information associated to 2 ports (according to indication by the first SRI field).

As another example, in FIG. 36, a UE could be configured with a second set of power control configuration. One or more power control configuration in the second set of power control configuration may comprise one or more subset of power control information. One subset of power control information may comprise at least sri-PUSCH-PathlossReferenceRS-Id, sri-P0-PUSCH-AlphaSetId, and/or sri-PUSCH-ClosedLoopIndex. In this example, power control configuration with ID 0~5 in the second set of power control configuration may be associated with {4, 3, 3, 3, 1, 1} subsets of power control information, respectively.

Concept 4:

In general, this concept is that one (decimal) value or index of a second SRI field may associate to one or more ID associated to one or more power control configuration. A UE could determine or derive one ID associated with power control configuration among the one or more IDs associated with one or more power control configurations based on a number of ports/port number. The UE could determine or derive the number of ports/port number based on a first SRI field.

The association between one value or index of the second SRI fields and one or more IDs associated with one or more power control configurations may be determined based on at least a first SRS resource set and/or a second SRS resource set. The first SRS resource set may have a first number of SRS resources. The second SRS resource set may have a second number of SRS resources. The first number of SRS resources could be different than the second number of SRS resources. The number of ports, ranks, or layers indicated by the first SRI field could be the same as the number of ports, ranks, or layers being indicated by the second SRI field.

In one embodiment, the UE could expect the first number of SRS resources as being the same as the second number of SRS resources. Code-points for 1 port could be associated with, or determined or derived by combination formula C(the second number or the first number, 1). Code-points for 2 port could be associated with or determined or derived by combination formula C(the second number or the first number, 2). Code-points for 3 port could be associated with or determined or derived by combination formula C(the second number or the first number, 3). Code-points for 4 port could be associated with or determined or derived by combination formula C(the second number or the first number, 4).

In one embodiment, the number of the one or more IDs (associated with one or more power control configurations) for a (decimal) value of the second SRI field could be determined by a count for counting 1~4 ports with available code points corresponding to the (decimal) value of the second SRI field. For example, in FIG. 37, the 2$^{nd}$ SRI field of "011" may be associated with 1 port, 2 ports, 3 ports. In other words, the 2$^{nd}$ SRI field of "011" may be associated with 3 IDs that are associated with power control configuration.

In one embodiment, how many IDs (associated with one or more power control configurations) corresponding to one (decimal) value of the second SRI field may be based on at least the number of SRS resources of a SRS resource set associated with the second SRI field. In one embodiment, how many IDs (associated with one or more power control configurations) corresponding to one (decimal) value of the second SRI field may be based on at least code-points for one or more number of ports associated with a SRS resource set that is associated with the second SRI field.

In one embodiment, the ID associated with one power control configuration may be indexed for code-points for one or more number of ports in an increasing order. As shown in FIG. 37, code-points 0~3 for 1 port is associated with ID (associated with power control configuration) 0~3, followed by code-points 0~5 for 2 ports being associated with ID 4~9, followed by code-points 0~3 for 3 ports being associated with ID 10~13, followed by code-points 0 for 4 ports being associated with ID 14.

For example, in FIG. 37, (decimal) value 0 or index 0 of $2^{nd}$ SRI field may be associated with four SRI-PUSCH-PowerControlId (e.g., 0, 4, 10, 14). When the UE receives a DCI with $1^{st}$ SRI field indicating 3 ports and with $2^{nd}$ SRI field with value "000", the UE could determine SRI-PUSCH-PowerControlId as 10 based on 3 ports indicated by $1^{st}$ SRI field.

For all Above Concepts, Methods, Alternatives and Embodiments

Any of above methods, alternatives, and embodiments may be combined or applied simultaneously.

In one embodiment, since a SRS resource set may be associated with the first SRI field (e.g., with larger bits) or the second SRI field (e.g., with reduced bits), the maximum number of SRI-PUSCH-PowerControl could be the maximum number of code-points associated with the first SRI field or the second SRI field. In other words, for a SRS resource set associated with the second SRI field, the maximum number of SRI-PUSCH-PowerControl could be the maximum number of code-points associated with the first SRI field.

For example, the UE could be configured with two sets of power control configuration (e.g., a first set of power control configuration, a second set of power control configuration). The first set of power control configuration may be associated with the first SRI field, and the second set of power control configuration may be associated with the second SRI field. In this example, since the specific field described in Concept 1 may indicate that the first SRI field being associated with the second set of power control configuration, the maximum number of power control configuration in the second set of power control configuration may be determined based on the first SRI field (and not based on the second SRI field).

As another example, in FIG. 32 and FIG. 38, a UE could be configured with two set of power control configuration (e.g., sri-PUSCH-MappingToAddModList (for $1^{st}$ TRP), sri-PUSCH-MappingToAddModList (for $2^{nd}$ TRP)).

If dynamic switch order is not configured or supported or a fixed relation between the first/second SRI field and the first/second SRS resource set, the maximum number of power control configuration in the second set of power control configuration (associated to the second SRI field) may be determined or derived based on the second SRI field. In this example, a maximum of 8 power control configurations could be configured in the second set of power control configuration.

If dynamic switch order is configured or supported or there is no fixed relation between the first/second SRI field and the first/second SRS resource set, the maximum number of power control configuration in the second set of power control configuration (associated to the second SRI field) may be determined or derived based on the first SRI field. In this example, a maximum of 16 power control configurations could be configured in the second set of power control configuration.

In one embodiment, the first SRI field could indicate rank or layer or a number of port based on information of indicated code-points. For example, in FIG. 32, code-points 0~3 of the first SRI field (decimal value 0~3 of the first SRI field) corresponds or indicates 1 rank, layer, or port. Code-points 4~9 of the first SRI field (decimal value 4~9 of the first SRI field) corresponds or indicates 2 ranks, layers, or ports. Code-points 10~13 of the first SRI field (decimal value 10~13 of the first SRI field) corresponds or indicates 3 ranks, layers, or ports. Code-points 14 of the first SRI field (decimal value 14 of the first SRI field) corresponds or indicates 4 ranks, layers, or ports.

Any combination of above concepts can be jointly combined or formed to a new embodiment. The following embodiments can be used to solve at least (but not limited to) the issues discussed above.

Figure 42:
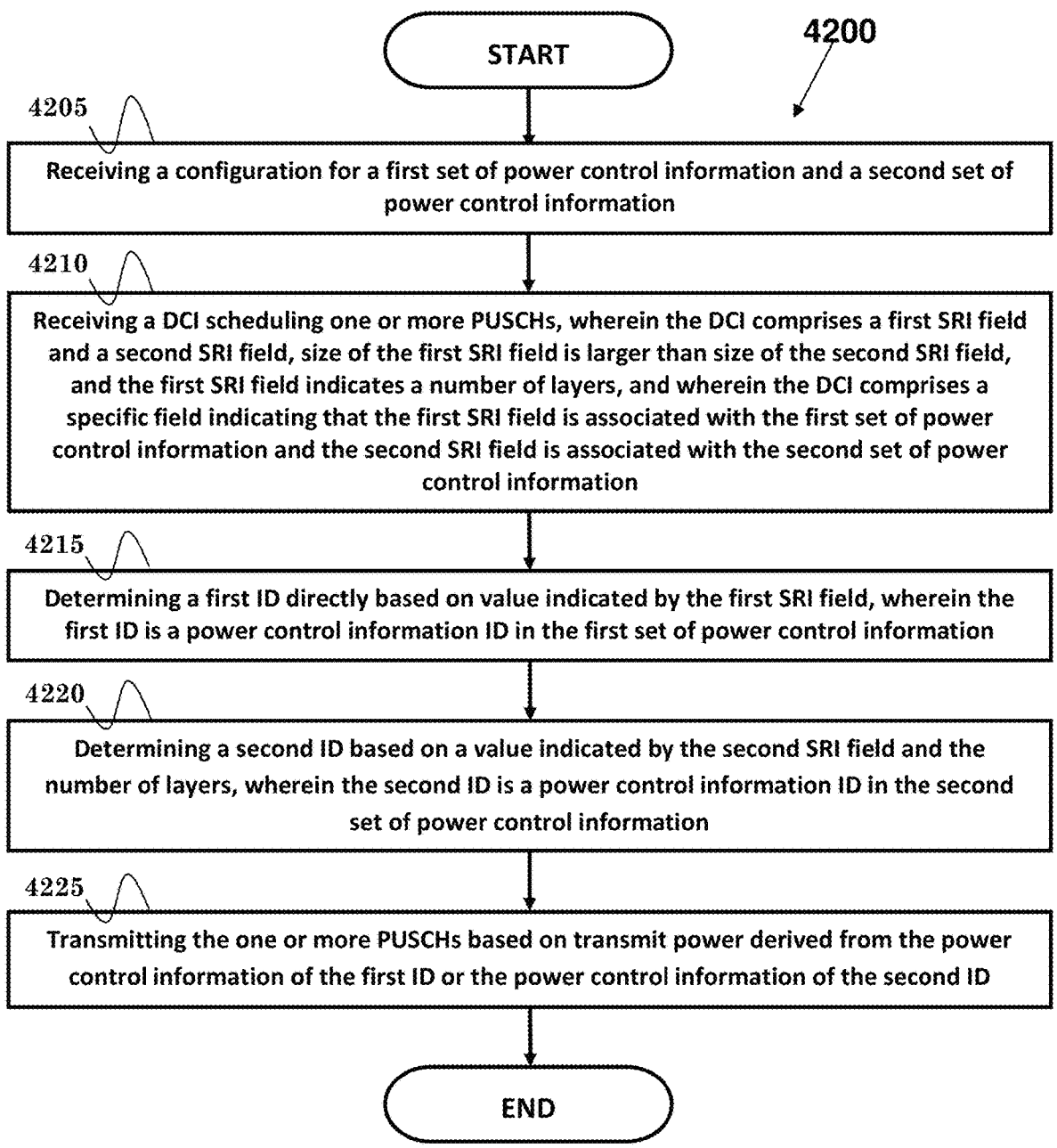
FIG. 42 is a flow chart according to one exemplary embodiment.

FIG. 42 is a flow chart 4200 according to one exemplary embodiment from the perspective of a User Equipment (UE). In step 4205, the UE receives a configuration for a first set of power control information and a second set of power control information. In step 4210, the UE receives a DCI scheduling one or more PUSCHs, wherein the DCI comprises a first SRI field and a second SRI field, size of the first SRI field is larger than size of the second SRI field, and the first SRI field indicates a number of layers, and wherein the DCI comprises a specific field indicating that the first SRI field is associated with the first set of power control information and the second SRI field is associated with the second set of power control information. In step 4215, the UE determines a first ID directly based on value indicated by the first SRI field, wherein the first ID is a power control information ID in the first set of power control information. In step 4220, the UE determines a second ID based on a value indicated by the second SRI field and the number of layers, wherein the second ID is a power control information ID in the second set of power control information. In step 4225, the UE transmits the one or more PUSCHs based on transmit power derived from the power control information of the first ID or the power control information of the second ID.

In one embodiment, the number of layers could be larger than 1. The number of layers associated with the first SRI field could be the same as the second SRI field.

In one embodiment, a first subset of PUSCHs of the one or more PUSCHs could be associated with the first SRI field. Furthermore, the first subset of PUSCHs could be transmitted with transmit power derived from power control information of the first ID. The first SRI field could be associated with a first SRS resource set. The first SRI field could be associated with a first spatial filter.

In one embodiment, a second subset of PUSCHs of the one or more PUSCH(s) could be associated with the second SRI field. The second subset of PUSCH could be transmitted with transmit power derived from power control information of the second ID. The second SRI field could be associated with a second SRS resource set. The second SRI field could be associated with a second spatial filter.

In one embodiment, power control information may comprise pathloss reference signal (e.g., PL RS), target received power (in network side, e.g., P0), pathloss compensation value (e.g., alpha), and/or closed loop index. The first ID could be (y+1)-th ID in the first set of power control configurations, and y is value of the first SRI field. The second ID could be (x+1)-th ID from a lowest ID associated with the number of layers in the second set of power control configuration, and x is value of the second SRI field.

In one embodiment, a first number of SRS resource(s) in a first SRS resource set may be the same as a second number of SRS resource(s) in a second SRS resource set. The UE may not expect to receive configuration for configuring the first SRS resource set and the second SRS resource set such that the first number of SRS resource(s) in the first SRS resource set is different from the second number of SRS resource(s) in the second SRS resource set.

Referring back to FIGS. 3 and 4, in one exemplary embodiment of a UE. The network 300 includes a program code 312 stored in the memory 310. The CPU 308 could execute program code 312 to enable the UE (i) to receive a configuration for a first set of power control information and a second set of power control information, (ii) to receive a DCI scheduling one or more PUSCHs, wherein the DCI comprises a first SRI field and a second SRI field, size of the first SRI field is larger than size of the second SRI field, and the first SRI field indicates a number of layers, and wherein the DCI comprises a specific field indicating that the first SRI field is associated with the first set of power control information and the second SRI field is associated with the second set of power control information, (iii) to determine a first ID directly based on value indicated by the first SRI field, wherein the first ID is a power control information ID in the first set of power control information, (iv) to determine a second ID based on a value indicated by the second SRI field and the number of layers, wherein the second ID is a power control information ID in the second set of power control information, and (v) to transmit the one or more PUSCHs based on transmit power derived from the power control information of the first ID or the power control information of the second ID. Furthermore, the CPU 308 can execute the program code 312 to perform all of the above-described actions and steps or others described herein.

Figure 43:
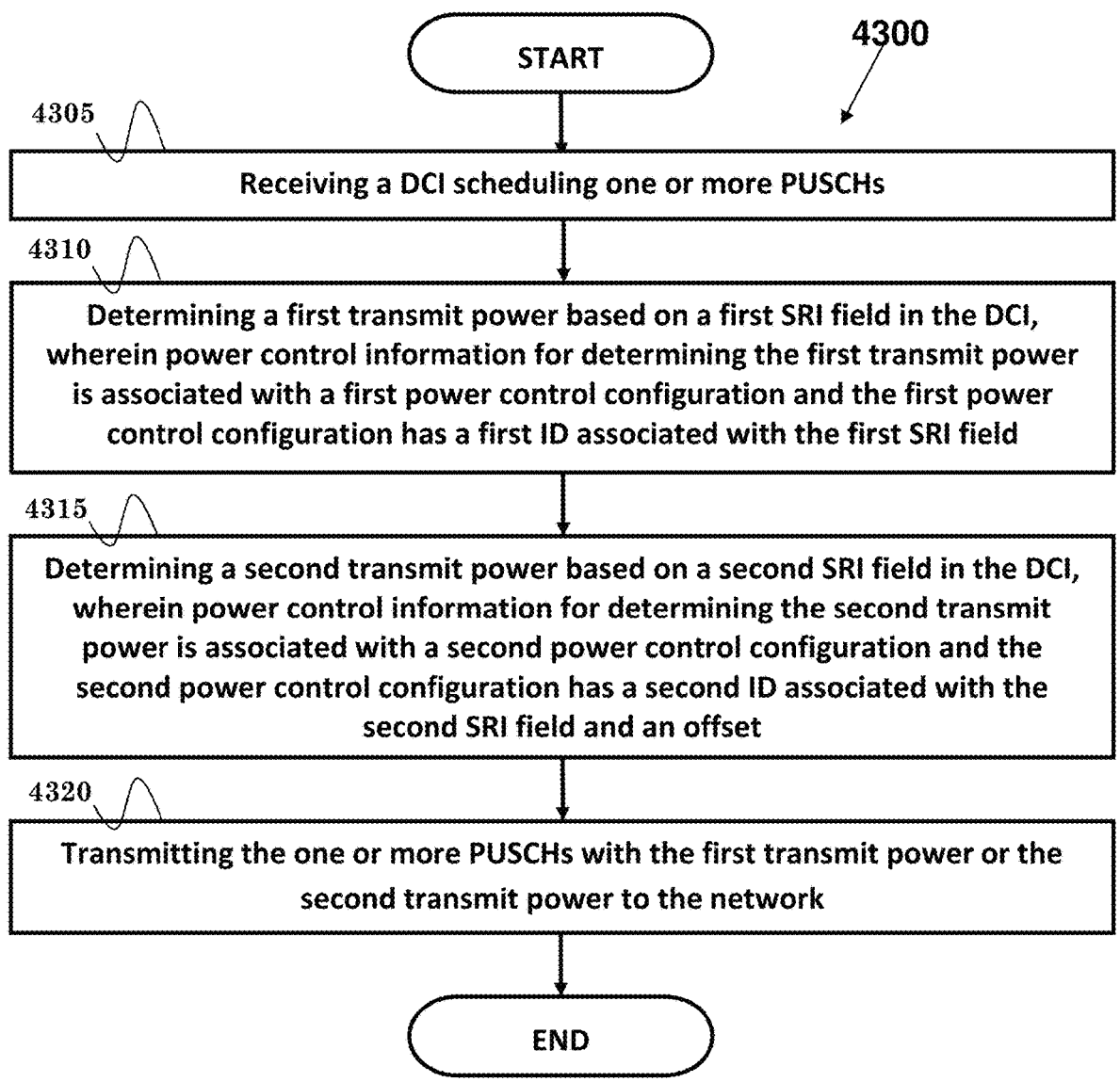
FIG. 43 is a flow chart according to one exemplary embodiment.

FIG. 43 is a flow chart 4300 according to one exemplary embodiment from the perspective of a User Equipment (UE). In step 4305, the UE receives a DCI scheduling one or more PUSCHs. In step 4310, the UE determines a first transmit power based on a first SRI field in the DCI, wherein power control information for determining the first transmit power is associated with a first power control configuration and the first power control configuration has a first ID associated to the first SRI field. In step 4315, the UE determines a second transmit power based on a second SRI field in the DCI, wherein power control information for determining the second transmit power is associated with a second power control configuration and the second power control configuration has a second ID associated to the second SRI field and an offset. In step 4320, the UE transmits the one or more PUSCHs with the first transmit power or the second transmit power to the network.

In one embodiment, the first SRI field could indicate a rank or a layer or a number of ports. The indicated rank or layer or the number of ports could be larger than 1.

In one embodiment, the offset could be associated with a number of code-points associated to one or more rank(s) or layer(s) or number of ports which is/are smaller than the indicated rank or layer or the number of ports. The size of the first SRI field could be larger than or equal to the size of the second SRI field. The second ID could be derived or determined based on (decimal) value of the second SRI field with the offset, and/or the second ID could be the sum of (decimal) value of the second SRI field and the offset.

In one embodiment, decimal value of the second SRI field, x (e.g., x=1 according to the second SRI field "001"), may be associated with (x+1)-th lowest ID for the indicated number of ports or layers or rank from the first SRI field. Decimal value of the first SRI field, x (e.g., x=1 according to the first SRI field "001"), may be associated with (x+1)-th ID.

In one embodiment, the second ID could be determined or derived among/from the one or more IDs associated with the one or more power control configurations based on at least one (decimal) value or index of the second SRI field and the indicated rank or layer or the number of ports. The second ID could be the (decimal) value or index of the second SRI field associated to the indicated rank or layer or the number of ports. The rank or layer or number of ports associated with the first SRI field could be the same as the second SRI field.

In one embodiment, a first subset of PUSCH of one or more PUSCHs could be associated with the first SRI field. The first subset of PUSCH could be transmitted with the first transmit power. The first SRI field could be associated with a first SRS resource set. The first SRI field could be associated with a first spatial filter/beam/source RS.

In one embodiment, a second subset of PUSCH of one or more PUSCHs could be associated with the second SRI field. The second subset of PUSCH could be transmitted with the second transmit power. The second SRI field could be associated with a second SRS resource set. The second SRI field could be associated with a second spatial filter/beam/source RS.

In one embodiment, power control information may comprise pathloss reference signal (e.g., PL RS), target received power (in network side, e.g., P0), pathloss compensation value (e.g., alpha), and/or closed loop index.

Referring back to FIGS. 3 and 4, in one exemplary embodiment of a UE. The network 300 includes a program code 312 stored in the memory 310. The CPU 308 could execute program code 312 to enable the UE (i) to receive a DCI scheduling one or more PUSCHs, (ii) to determine a first transmit power based on a first SRI field in the DCI, wherein power control information for determining the first transmit power is associated with a first power control configuration and the first power control configuration has a first ID associated to the first SRI field, (iii) to determine a second transmit power based on a second SRI field in the DCI, wherein power control information for determining the second transmit power is associated with a second power control configuration and the second power control configuration has a second ID associated to the second SRI field and an offset, and (iv) to transmit the one or more PUSCHs with the first transmit power or the second transmit power to the network. Furthermore, the CPU 308 can execute the program code 312 to perform all of the above-described actions and steps or others described herein.

Figure 44:
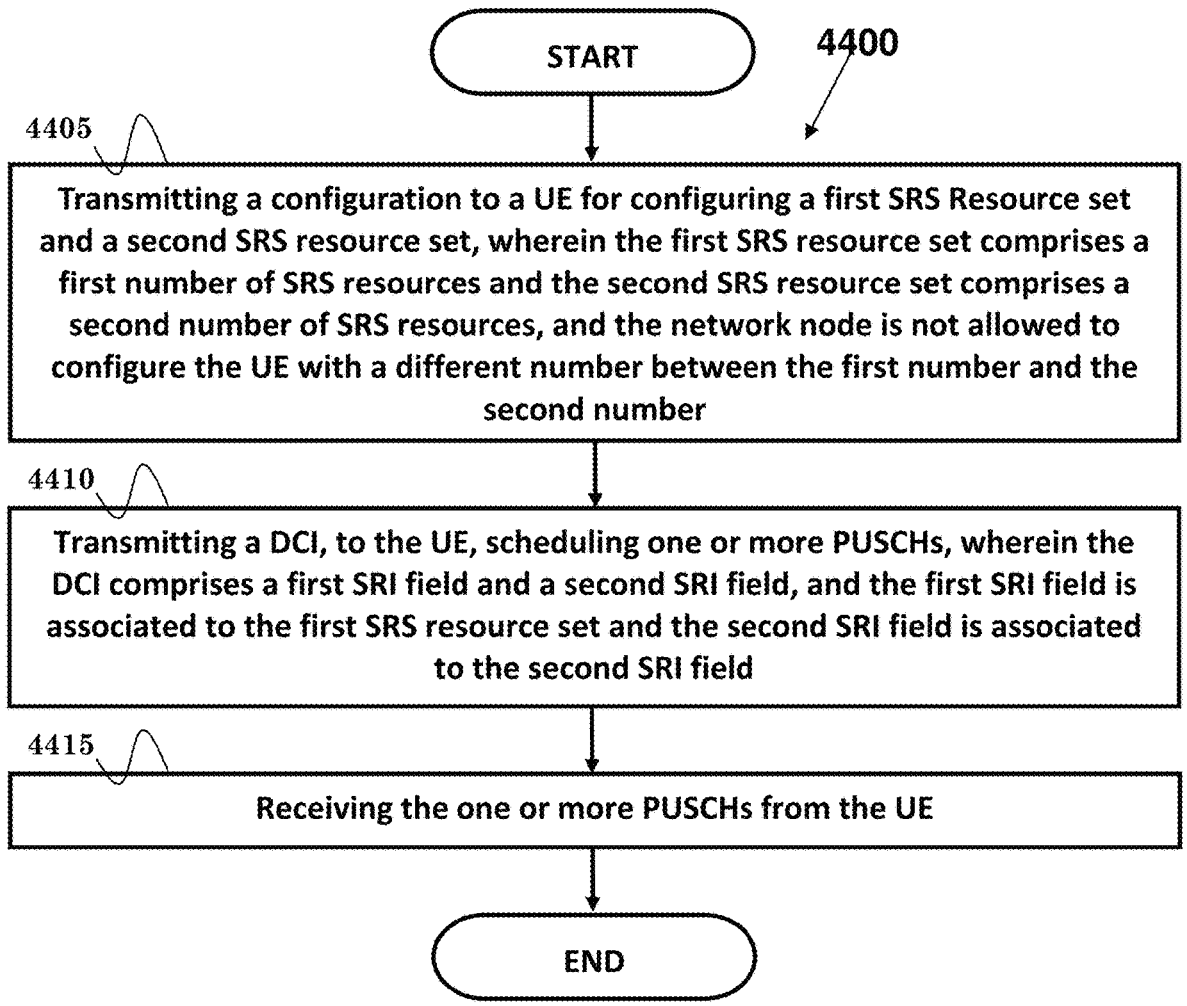
FIG. 44 is a flow chart according to one exemplary embodiment.

FIG. 44 is a flow chart 4400 according to one exemplary embodiment from the perspective of a network node. In step 4405, the network node transmits a configuration to a UE for configuring a first SRS resource set and a second SRS resource set, wherein the first SRS resource set comprises a first number of SRS resources and the second SRS resource set comprises a second number of SRS resources, and the network node is not allowed to configure the UE with a different number between the first number and the second number. In step 4410, the network node transmits a DCI, to the UE, scheduling one or more PUSCHs, wherein the DCI comprises a first SRI field and a second SRI field, and the first SRI field is associated to the first SRS resource set and the second SRI field is associated to the second SRI field. In step 4415, the network node receives the one or more PUSCHs from the UE.

In one embodiment, the DCI may comprise a specific field indicating that the first SRI field is associated with the first set of power control information and the second SRI field is associated with the second set of power control information. The network node could transmit a second configuration to the UE for configuring a first set of power control information and a second set of power control information. Size of the first SRI field could be larger than size of the second SRI field, and the first SRI field could indicate a number of layers.

In one embodiment, a first ID, which is a power control information ID in the first set of power control information, could be (directly) provided by the first SRI field. A second ID, which is a power control information ID in the second set of power control information, could be based on a value indicated by the second SRI field and the number of layers. The one or more PUSCH(s) could be associated to transmit power derived from the power control information of the first ID or the power control information of the second ID.

In one embodiment, the number of layers may be larger than 1. The number of layers associated with the first SRI field may be the same as the second SRI field. A first subset of PUSCHs of the one or more PUSCHs could be associated with the first SRI field. The first subset of PUSCHs could be associated with transmit power derived from power control information of the first ID. The first SRI field could be associated with a first spatial filter.

In one embodiment, a second subset of PUSCHs of the one or more PUSCH(s) could be associated with the second SRI field. The second subset of PUSCH could be associated with transmit power derived from power control information of the second ID. The second SRI field could be associated with a second spatial filter.

In one embodiment, power control information may comprise pathloss reference signal, target received power, pathloss compensation value, and/or closed loop index. The first ID may be (y+1)-th ID in the first set of power control configurations, and y may be value of the first SRI field. The second ID may be (x+1)-th ID from a lowest ID associated with the number of layers in the second set of power control configuration, and x may be value of the second SRI field.

Referring back to FIGS. 3 and 4, in one exemplary embodiment of a network node. The network 300 includes a program code 312 stored in the memory 310. The CPU 308 could execute program code 312 to enable the network node (i) to transmit a configuration to a UE for configuring a first SRS resource set and a second SRS resource set, wherein the first SRS resource set comprises a first number of SRS resources and the second SRS resource set comprises a second number of SRS resources, and the network node is not allowed to configure the UE with a different number between the first number and the second number, (ii) to transmit a DCI, to the UE, scheduling one or more PUSCHs, wherein the DCI comprises a first SRI field and a second SRI field, and the first SRI field is associated to the first SRS resource set and the second SRI field is associated to the second SRS resource set, and (iii) to receive the one or more PUSCHs from the UE. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), comprising:
   receiving a configuration for a first set of power control information and a second set of power control information;
   receiving a Downlink Control Information (DCI) scheduling one or more Physical Uplink Shared Channels (PUSCHs), wherein the DCI comprises a first Sounding Reference Signal Resource Indicator (SRI) field and a second SRI field, size of the first SRI field is larger than size of the second SRI field, and the first SRI field indicates a number of layers, and
   wherein the DCI comprises a specific field indicating that the first SRI field is associated with the first set of power control information and the second SRI field is associated with the second set of power control information;
   determining a first Identifier (ID) directly based on value indicated by the first SRI field, wherein the first ID is a power control information ID in the first set of power control information;
   determining a second ID based on a value indicated by the second SRI field and the number of layers, wherein the second ID is a power control information ID in the second set of power control information, and
   transmitting the one or more PUSCHs based on transmit power derived from the power control information of the first ID or the power control information of the second ID;
   wherein the first ID is (y+1)-th ID from power control information ID 0, and y is value of the first SRI field, and/or the second ID is (x+1)-th ID from a lowest power control information ID associated with the number of layers, and x is value of the second SRI field.

2. The method of claim 1, wherein the number of layers is larger than 1.

3. The method of claim 1, wherein the number of layers associated with the first SRI field is the same as the second SRI field.

4. The method of claim 1, wherein the first SRI field is associated with a first Sounding Reference Signal (SRS) resource set, and/or
   the second SRI field is associated with a second Sounding Reference Signal (SRS) resource set.

5. The method of claim 4, wherein a first subset of PUSCHs of the one or more PUSCHs is associated with the first SRI field, and/or
   the first subset of PUSCHs is transmitted with transmit power derived from power control information of the first ID, and/or
   the first SRI field is associated with a first spatial filter, and/or
   a second subset of PUSCHs of the one or more PUSCH(s) is associated with the second SRI field, and/or
   the second subset of PUSCH is transmitted with transmit power derived from power control information of the second ID, and/or
   the second SRI field is associated with a second spatial filter.

6. The method of claim 1, wherein power control information comprises pathloss reference signal, target received power, pathloss compensation value, and/or closed loop index.

7. The method of claim 4, wherein a first number of SRS resource(s) in the first SRS resource set is the same as a second number of SRS resource(s) in the second SRS resource set, and/or
   the UE does not expect to receive configuration for configuring the first SRS resource set and the second SRS resource set such that the first number of SRS resource(s) in the first SRS resource set is different from the second number of SRS resource(s) in the second SRS resource set.

8. A User Equipment (UE), comprising:
   a control circuit;
   a processor installed in the control circuit; and
   a memory installed in the control circuit and operatively coupled to the processor;
   wherein the processor is configured to execute a program code stored in the memory to:
     receive a configuration for a first set of power control information and a second set of power control information;
     receive a Downlink Control Information (DCI) scheduling one or more Physical Uplink Shared Channels (PUSCHs), wherein the DCI comprises a first Sounding Reference Signal Resource Indicator (SRI) field and a second SRI field, size of the first SRI field is larger than size of the second SRI field, and the first SRI field indicates a number of layers, and
     wherein the DCI comprises a specific field indicating that the first SRI field is associated with the first set of power control information and the second SRI field is associated with the second set of power control information;
     determine a first Identifier (ID) directly based on value indicated by the first SRI field, wherein the first ID is a power control information ID in the first set of power control information;

determine a second ID based on a value indicated by the second SRI field and the number of layers, wherein the second ID is a power control information ID in the second set of power control information, and transmit the one or more PUSCHs based on transmit power derived from the power control information of the first ID or the power control information of the second ID;

wherein the first ID is (y+1)-th ID from power control information ID 0, and y is value of the first SRI field, and/or the second ID is (x+1)-th ID from a lowest power control information ID associated with the number of layers, and x is value of the second SRI field.

9. The UE of claim 8, wherein the number of layers is larger than 1.

10. The UE of claim 8, wherein the number of layers associated with the first SRI field is the same as the second SRI field.

11. The UE of claim 8, wherein
the first SRI field is associated with a first Sounding Reference Signal (SRS) resource set, and/or
the second SRI field is associated with a second Sounding Reference Signal (SRS) resource set.

12. The UE of claim 8, wherein a first subset of PUSCHs of the one or more PUSCHs is associated with the first SRI field, and/or
the first subset of PUSCHs is transmitted with transmit power derived from power control information of the first ID, and/or
the first SRI field is associated with a first spatial filter, and/or
a second subset of PUSCHs of the one or more PUSCH(s) is associated with the second SRI field, and/or
the second subset of PUSCH is transmitted with transmit power derived from power control information of the second ID, and/or
the second SRI field is associated with a second spatial filter.

13. The UE of claim 8, wherein power control information comprises pathloss reference signal, target received power, pathloss compensation value, and/or closed loop index.

14. The UE of claim 8, wherein a first number of SRS resource(s) in the first SRS resource set is the same as a second number of SRS resource(s) in the second SRS resource set, and/or
the UE does not expect to receive configuration for configuring the first SRS resource set and the second SRS resource set such that the first number of SRS resource(s) in the first SRS resource set is different from the second number of SRS resource(s) in the second SRS resource set.

15. A method of a network node, comprising:
transmitting a configuration to a UE for configuring a first Sounding Reference Signal (SRS) resource set and a second SRS resource set, wherein the first SRS resource set comprises a first number of SRS resources and the second SRS resource set comprises a second number of SRS resource(s), and the network node is not allowed to configure the UE with a different number between the first number and the second number;
transmitting a second configuration to the UE for configuring a first set of power control information and a second set of power control information;
transmitting a Downlink Control Information (DCI), to the UE, scheduling one or more Physical Uplink Shared Channels (PUSCHs), wherein the DCI comprises a first Sounding Reference Signal Resource Indicator (SRI) field and a second SRI field, and the first SRI field is associated to the first SRS resource set and the second SRI field is associated to the second SRI field; and
receiving the one or more PUSCHs from the UE;
wherein the first ID is (y+1)-th ID from power control information ID 0, and y is value of the first SRI field, and/or the second ID is (x+1)-th ID from a lowest power control information ID associated with the number of layers, and x is value of the second SRI field.

16. The method of claim 15, wherein the DCI comprises a specific field indicating that the first SRI field is associated with the first set of power control information and the second SRI field is associated with the second set of power control information.

17. The method of claim 15, wherein size of the first SRI field is larger than size of the second SRI field, and the first SRI field indicates a number of layers.

18. The method of claim 15, wherein the first SRI field indicates the number of layers, and/or the number of layers is larger than 1.

19. The method of claim 15, wherein the network node schedules the one or more PUSCHs with transmit power derived from the power control information of the first ID or the power control information of the second ID.

* * * * *